United States Patent
Okada et al.

(10) Patent No.: US 10,734,922 B2
(45) Date of Patent: Aug. 4, 2020

(54) POWER GENERATING ELEMENT AND POWER GENERATING DEVICE

(71) Applicant: TRI-FORCE MANAGEMENT CORPORATION, Saitama-ken (JP)

(72) Inventors: Kazuhiro Okada, Saitama-ken (JP); Miho Okada, Saitama-ken (JP)

(73) Assignee: TRI-FORCE MANAGEMENT CORPORATION, Saitama-Ken (JP)

( * ) Notice: Subject to any disclaimer, the term of this patent is extended or adjusted under 35 U.S.C. 154(b) by 95 days.

(21) Appl. No.: 15/758,634

(22) PCT Filed: Apr. 5, 2017

(86) PCT No.: PCT/JP2017/014283
§ 371 (c)(1),
(2) Date: Mar. 8, 2018

(87) PCT Pub. No.: WO2018/185895
PCT Pub. Date: Oct. 11, 2018

(65) Prior Publication Data
US 2019/0131890 A1    May 2, 2019

(51) Int. Cl.
*H02N 1/08*    (2006.01)
*H02K 35/02*    (2006.01)
(Continued)

(52) U.S. Cl.
CPC ............ *H02N 1/08* (2013.01); *H02K 35/00* (2013.01); *H02K 35/02* (2013.01); *H02N 1/00* (2013.01); *H02N 1/10* (2013.01)

(58) Field of Classification Search
CPC ... H02N 1/06; H02N 1/08; H02N 1/10; B06B 1/0292; B06B 2201/51; F03B 13/10; B81B 3/0018; B81B 3/0021
(Continued)

(56) References Cited

U.S. PATENT DOCUMENTS

2004/0130221 A1    7/2004    Ichii et al.
2008/0048521 A1    2/2008    Mabuchi et al.
(Continued)

FOREIGN PATENT DOCUMENTS

JP    2002-199689 A    7/2002
JP    2007-692 A    1/2007
(Continued)

OTHER PUBLICATIONS

Tao et al., Broadband Energy Harvesting Using a Nonliner 2DOP MEMS Electret Power Generator, Feb. 2016, 2016 IEEE 29th Inter. Conf. on Micro Electro Mech. Systems (MEMS) (Year: 2016).*
(Continued)

*Primary Examiner* — Quyen P Leung
*Assistant Examiner* — Eric Johnson
(74) *Attorney, Agent, or Firm* — Ladas & Parry LLP

(57) ABSTRACT

A power generating element 1 according to an embodiment includes a displacement member 10, a displacement member 20, and a fixed member 30. The displacement member 10 and the displacement member 20 are connected via an elastic deformation body 41. The displacement member 10 is connected to an attachment section 51 via an elastic deformation body 42. The displacement member 10 and/or the displacement member 20 includes a first power generation surface. The fixed member 30 includes a second power generation surface opposed to the first power generation surface. An electret material layer is provided on one surface of the first power generation surface and the second power generation surface. A counter electrode layer is provided on the other surface.

21 Claims, 24 Drawing Sheets

(51) Int. Cl.
*H02K 35/00* (2006.01)
*H02N 1/10* (2006.01)
*H02N 1/00* (2006.01)

(58) Field of Classification Search
USPC ....... 310/15–17, 19–39, 300, 308, 309, 310; 290/1 R; 322/2 A
See application file for complete search history.

(56) References Cited

U.S. PATENT DOCUMENTS

| | | | |
|---|---|---|---|
| 2011/0109195 A1* | 5/2011 | Nakatsuka | H02N 1/08 310/300 |
| 2016/0197261 A1* | 7/2016 | Abdelkefi | H01L 41/1136 310/312 |

FOREIGN PATENT DOCUMENTS

| | | | |
|---|---|---|---|
| JP | 2008-86190 A | | 4/2008 |
| JP | 2010279106 A | * | 12/2010 ............... H02N 1/08 |
| JP | 2011-160548 A | | 8/2011 |
| JP | 2013-198314 A | | 9/2013 |
| JP | 2014-128040 A | | 7/2014 |
| WO | 2007/121380 A1 | | 10/2007 |

OTHER PUBLICATIONS

Nakamura, Machine Translation of JP2014128040, Jul. 2014 (Year: 2014).*
Yamakawa et al., Machine Translation of JP2013198314, Sep. 2013 (Year: 2013).*
Wakabayashi, Machine Translation of JP2010279106, Dec. 2010 (Year: 2010).*
International Search Report (ISR) dated Jul. 18, 2017 for Application No. PCT/JP2017/014283.
English translation of JP 2011-160548 A.
J-PlatPat English translation of JP 2014-128040 A.
J-PlatPat English translation of JP 2013-198314 A.
J-PlatPat English translation of JP 2007-692 A.
International Preliminary Report on Patentability (IPRP) and Written Opinion (WO) dated Oct. 17, 2019 mailed in connection with International Application No. PCT/JP2017/014283.

* cited by examiner (a)

(b)

(c)

| | RESONANT FREQUENCY fr: LOW | | RESONANT FREQUENCY fr: HIGH | |
|---|---|---|---|---|
| ELASTIC DEFORMATION BODY — THICKNESS t | THIN | SPRING CONSTANT k SMALL (SOFT) | THICK | SPRING CONSTANT k LARGE (HARD) |
| WIDTH w | NARROW | | WIDE | |
| LENGTH L | LONG | | SHORT | |
| MATERIAL | SOFT (YOUNG'S MODULUS E: SMALL) | | HARD (YOUNG'S MODULUS E: LARGE) | |
| DISPLACEMENT MEMBER | HEAVY (MASS m: LARGE) | | LIGHT (MASS m: SMALL) | |

US 10,734,922 B2

POWER GENERATING ELEMENT AND POWER GENERATING DEVICE

RELATED APPLICATION

This application is an application under 35 U.S.C. 371 of International Application No. PCT/JP2017/014283 filed on Apr. 5, 2017, the entire contents of which are incorporated herein by reference.

TECHNICAL FIELD

The present invention relates to a power generating element and, more particularly, to a power generating element that performs power generation using an electret material and a power generating device in which the power generating element is used.

BACKGROUND ART

There has been conventionally known an electret power generating element (hereinafter simply referred to as "power generating element" as well) that converts vibration energy into electric energy using an electret material. The electret material is a dielectric in which dielectric polarization remains even if an electric field is eliminated as in magnetic polarization of a permanent magnet.

Patent Literature 1 describes a power generating element including a first electrode including an electret material and a second electrode made of metal. In this power generating element, the first electrode or the second electrode elastically moves in an XY plane and a charge amount electrostatically induced to the second electrode changes, whereby electric energy is extracted to the outside of the power generating element.

CITATION LIST

Patent Literature

Patent Literature 1: Japanese Patent Application Laid-Open No. 2008-86190

SUMMARY OF INVENTION

Technical Problem

Incidentally, in an electret power generating element, a displacement member (a vibrating body) such as an electrode, which receives vibration from an environment and elastically moves, is usually configured from a semiconductor such as silicon or metal. Therefore, a resonant frequency of the power generating element has a characteristic that a peak is high (a Q value is high) but a half-value width is narrow. Therefore, in order to improve power generation efficiency of the power generating element, it is necessary to adjust the resonant frequency to a vibration frequency of the environment.

On the other hand, not only a specific frequency but also vibrations having various frequencies are mixed in the environment. Therefore, it is difficult to improve the power generation efficiency simply by adjusting the resonant frequency of the power generating element to the specific frequency.

Further, the resonant frequency of the power generating element changes according to temperature fluctuation and external stress. Therefore, even if the resonant frequency is adjusted to the frequency of environmental vibration (e.g., a frequency having the largest peak), there is a problem in that the power generation efficiency is deteriorated by fluctuation in the resonant frequency due to temperature fluctuation and the like.

The present invention has been devised on the basis of the technical recognition explained above, and an object of the present invention is to provide a power generating element capable of expanding a power generation frequency band.

Solution to Problem

A power generating element according to the present invention is a power generating element including: a first displacement member; a second displacement member; and a fixed member, the first displacement member and the second displacement member being connected via a first elastic deformation body, the first displacement member being connected to an attachment section via a second elastic deformation body, the first displacement member and/or the second displacement member including a first power generation surface, and the fixed member including a second power generation surface opposed to the first power generation surface, and an electret material layer being provided on one surface of the first power generation surface and the second power generation surface, and a counter electrode layer being provided on another surface.

In the power generating element,
the second displacement member may be disposed on an outside of the first displacement member.

In the power generating element,
the first displacement member may include:
a first displacement surface facing the second displacement member side;
a second displacement surface on an opposite side of the first displacement surface; and
a first connection surface that connects the first displacement surface and the second displacement surface, and
the second displacement member may include:
a third displacement surface opposed to the first displacement surface;
a fourth displacement surface on an opposite side of the third displacement surface; and
a second connection surface that connects the third displacement surface and the fourth displacement surface.

In the power generating element,
the first connection surface or the second connection surface may configure the first power generation surface, and
when vibration energy is given to the power generating element, a projection overlap area between the electret material layer and the counter electrode layer may fluctuate.

In the power generating element,
both of the first connection surface and the second connection surface may configure the first power generation surface,
a first electret material layer may be provided on the first connection surface, and a second electret material layer may be provided on the second connection surface,
a first counter electrode layer corresponding to the first electret material layer and a second counter electrode layer corresponding to the second electret material layer may be provided on the second power generation surface, and
when vibration energy is given to the power generating element, a first projection overlap area between the first electret material layer and the first counter electrode layer and a second projection overlap area between the second electret material layer and the second counter electrode layer may fluctuate.

In the power generating element, the second displacement surface or the fourth displacement surface may configure the first power generation surface, and when vibration energy is given to the power generating element, an inter-layer distance between the electret material layer and the counter electrode layer may fluctuate.

In the power generating element, both of the second displacement surface and the fourth displacement surface may configure the first power generation surface, and a first electret material layer may be provided on the fourth displacement surface, and a second electret material layer may be provided on the second displacement surface, a first counter electrode layer corresponding to the first electret material layer and a second counter electrode layer corresponding to the second electret material layer may be provided on the second power generation surface, and when vibration energy is given to the power generating element, a first inter-layer distance between the first electret material layer and the first counter electrode layer and a second inter-layer distance between the second electret material layer and the second counter electrode layer may fluctuate.

In the power generating element, the second displacement member may be connected to, via a third elastic deformation body, a second attachment section opposed to the attachment section.

In the power generating element, the second displacement member may be disposed on an inside of the first displacement member.

In the power generating element, the first displacement member may include:
a first displacement inner surface;
a second displacement inner surface opposed to the first displacement inner surface;
a connection inner surface that connects the first displacement inner surface and the second displacement inner surface;
a first displacement outer surface on an opposite side of the first displacement inner surface;
a second displacement outer surface on an opposite side of the second displacement inner surface; and
a connection outer surface that connects the first displacement outer surface and the second displacement outer surface, and
the second displacement member may include:
a first displacement surface opposed to the first displacement inner surface;
a second displacement surface opposed to the second displacement inner surface; and
a connection surface that connects the first displacement surface and the second displacement surface.

In the power generating element, a first electret material layer may be provided on the connection outer surface, a first counter electrode layer corresponding to the first electret material layer may be provided on the second power generation surface, and when vibration energy is given to the power generating element, a projection overlap area between the first electret material layer and the first counter electrode layer may fluctuate.

In the power generating element, a second electret material layer may be provided on the connection surface, a second counter electrode layer corresponding to the second electret material layer may be provided on the connection inner surface, and when vibration energy is given to the power generating element, a projection overlap area between the second electret material layer and the second counter electrode layer may fluctuate.

In the power generating element, a second electret material layer may be provided on the second displacement surface, a second counter electrode layer corresponding to the second electret material layer may be provided on the second displacement inner surface, and when vibration energy is given to the power generating element, an inter-layer distance between the second electret material layer and the second counter electrode layer may fluctuate.

In the power generating element, a first electret material layer may be provided on the first displacement outer surface or the second displacement outer surface, a first counter electrode layer corresponding to the first electret material layer may be provided on the second power generation surface, and when vibration energy is given to the power generating element, an inter-layer distance between the electret material layer and the counter electrode layer may fluctuate.

In the power generating element, a second electret material layer may be provided on the second displacement surface, a second counter electrode layer corresponding to the second electret material layer may be provided on the second displacement inner surface, and when vibration energy is given to the power generating element, an inter-layer distance between the second electret material layer and the second counter electrode layer may fluctuate.

In the power generating element, a second electret material layer may be provided on the connection surface, a second counter electrode layer corresponding to the second electret material layer may be provided on the connection inner surface, and when vibration energy is given to the power generating element, a projection overlap area between the second electret material layer and the second counter electrode layer may fluctuate.

In the power generating element, the power generating element may further include a third displacement member disposed on an inside of the first displacement member and connected to the first displacement member via a third elastic deformation body.

In the power generating element, the first displacement member may be configured as a first frame-like structure that surrounds the second displacement member, the second displacement member may be configured by a tabular structure, and the fixed member may be configured as a second frame-like structure that surrounds the first frame-like structure.

In the power generating element, the first frame-like structure may include:
a first displacement inner surface;

a second displacement inner surface opposed to the first displacement inner surface;

a connection inner surface that connects the first displacement inner surface and the second displacement inner surface;

a first displacement outer surface on an opposite side of the first displacement inner surface;

a second displacement outer surface on an opposite side of the second displacement inner surface; and a connection outer surface that connects the first displacement outer surface and the second displacement outer surface, and the second frame-like structure may include:

a first fixed inner surface opposed to the first displacement outer surface; and a second fixed inner surface opposed to the second displacement outer surface.

In the power generating element, a first displacement convex section may be provided on the first displacement outer surface, a second displacement convex section may be provided on the second displacement outer surface, a first fixed convex section may be provided in a position opposed to the first displacement convex section on the first fixed inner surface, a second fixed convex section may be provided in a position opposed to the second displacement convex section on the second fixed inner surface, a top surface of the first displacement convex section and a top surface of the first fixed convex section may be opposed to each other, a first electret material layer may be provided on one of these opposed surfaces, and a first counter electrode layer may be provided on another, and a top surface of the second displacement convex section and a top surface of the second fixed convex section may be opposed to each other, a second electret material layer may be provided on one of these opposed surfaces, and a second counter electrode layer may be provided on another.

In the power generating element, first displacement support points may be provided at respective four corner portions of the tabular structure, second displacement support points may be provided at respective four inner corner portions of the first frame-like structure, and third displacement support points may be provided at respective four outer corner portions of the first frame-like structure, fixed support points may be provided at respective four inner corner portions of the second frame-like structure, the first displacement support points and the second displacement support points may respectively correspond in a one-to-one relation, and the first displacement support points and the second displacement support points corresponding to each other may be respectively connected by individual elastic deformation bodies, and the third displacement support points and the fixed support points may respectively correspond in a one-to-one relation, and the third displacement support points and the fixed support points corresponding to each other may be respectively connected by individual elastic deformation bodies.

In the power generating element, the tabular structure may include a displacement surface configuring the first power generation surface, and the second frame-like structure may include a column section including a side surface opposed to the displacement surface of the tabular structure and configuring the second power generation surface.

In the power generating element, a displacement convex section may be provided on the displacement surface of the tabular structure, and a top surface of the displacement convex section and a side surface of the column section may be opposed to each other, an electret material layer may be provided on one of these opposed surfaces, and a counter electrode layer may be provided on another.

In the power generating element, a weight may be joined to an upper surface and/or a lower surface of the tabular structure.

In the power generating element, the tabular structure and/or the first frame-like structure may be configured to be displaceable in at least two directions among an X axis, a Y axis, and a Z axis of an XYZ three-dimensional orthogonal coordinate system fixed with respect to the second frame-like structure when vibration energy is given to the power generating element.

In the power generating element, a stopper protrusion projecting toward the first frame-like structure may be provided on an inner side surface of the second frame-like structure, and, in a state in which the first frame-like structure is not displaced, a predetermined gap dimension may be secured between the stopper protrusion and the first frame-like structure.

A power generating device according to the present invention includes:

the power generating element according to the present invention in which an electret electrode layer is provided in a lower layer of the electret material layer; and a power generation circuit that generates electric power on the basis of a voltage generated between the counter electrode layer and the electret electrode layer.

Advantageous Effects of Invention

In the power generating element according to the present invention, the first displacement member and the second displacement member are connected via the first elastic deformation body. The first displacement member is connected to the attachment section via the second elastic deformation body. The first displacement member and/or the second displacement member includes the first power generation surface. The fixed member includes the second power generation surface opposed to the first power generation surface. The electret material layer is provided on one surface of the first power generation surface and the second power generation surface. The counter electrode layer may be provided on the other surface. Consequently, two resonant systems, that is, a first resonant system related to vibration of the first displacement member and a second resonant system related to vibration of the second displacement member are formed. Therefore, it is possible to expand a power generation frequency band.

3(b) is a graph showing a frequency characteristic of vibration of a displacement member 20 in the power generating element.

Figure 4:
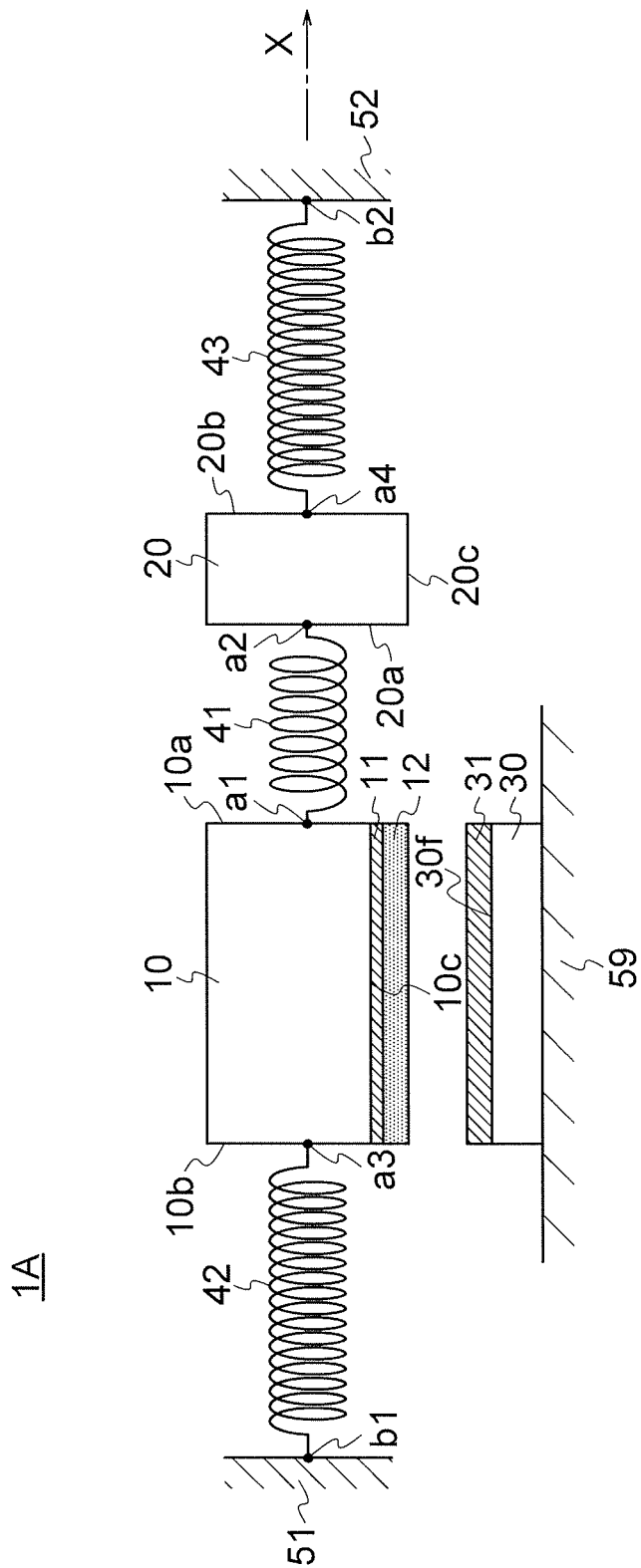

FIG. 4 is a plan view of a power generating element according to a modification 1 of the first embodiment.

Figure 5:
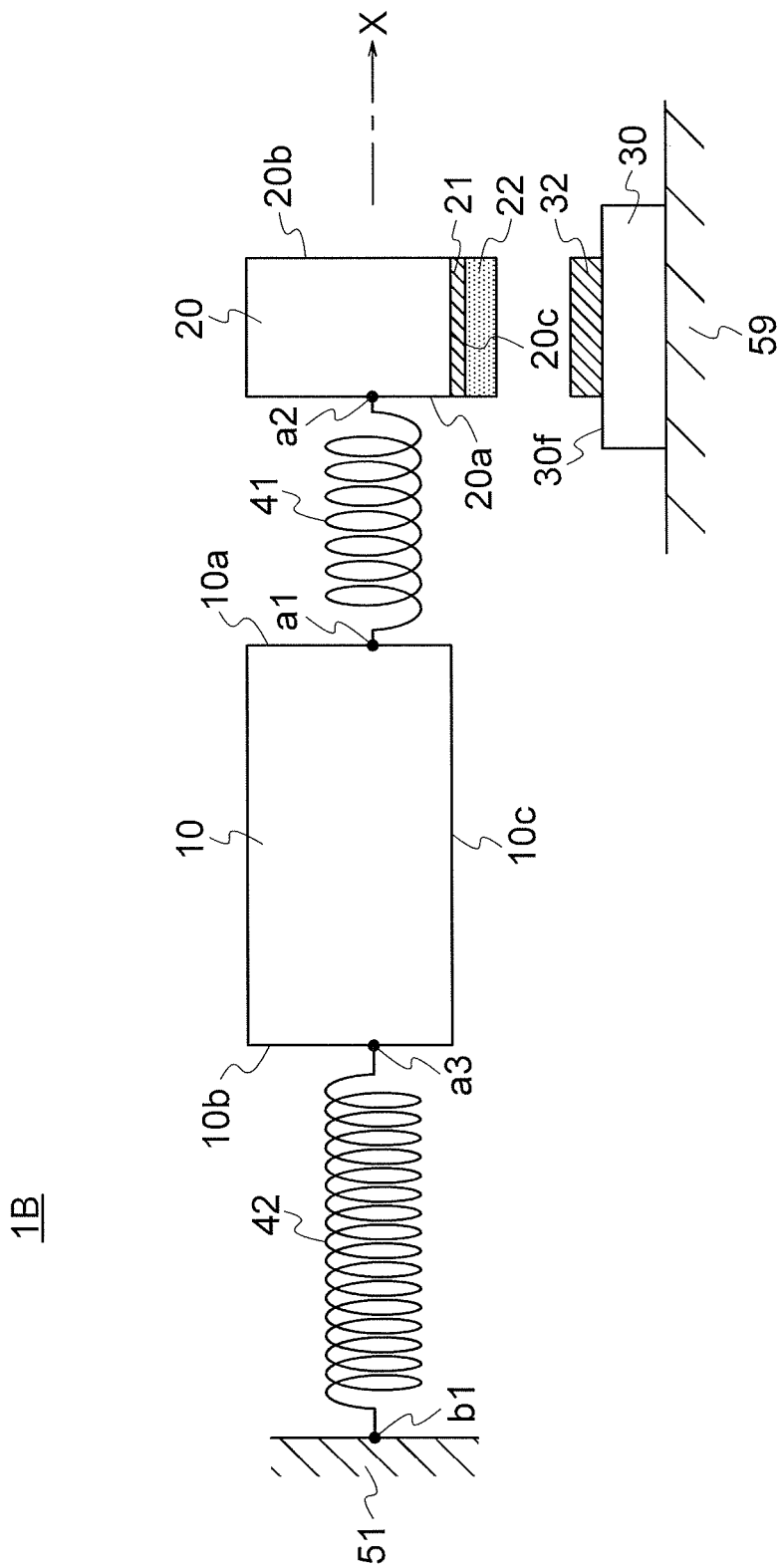

FIG. 5 is a plan view of a power generating element according to a modification 2 of the first embodiment.

Figure 6:
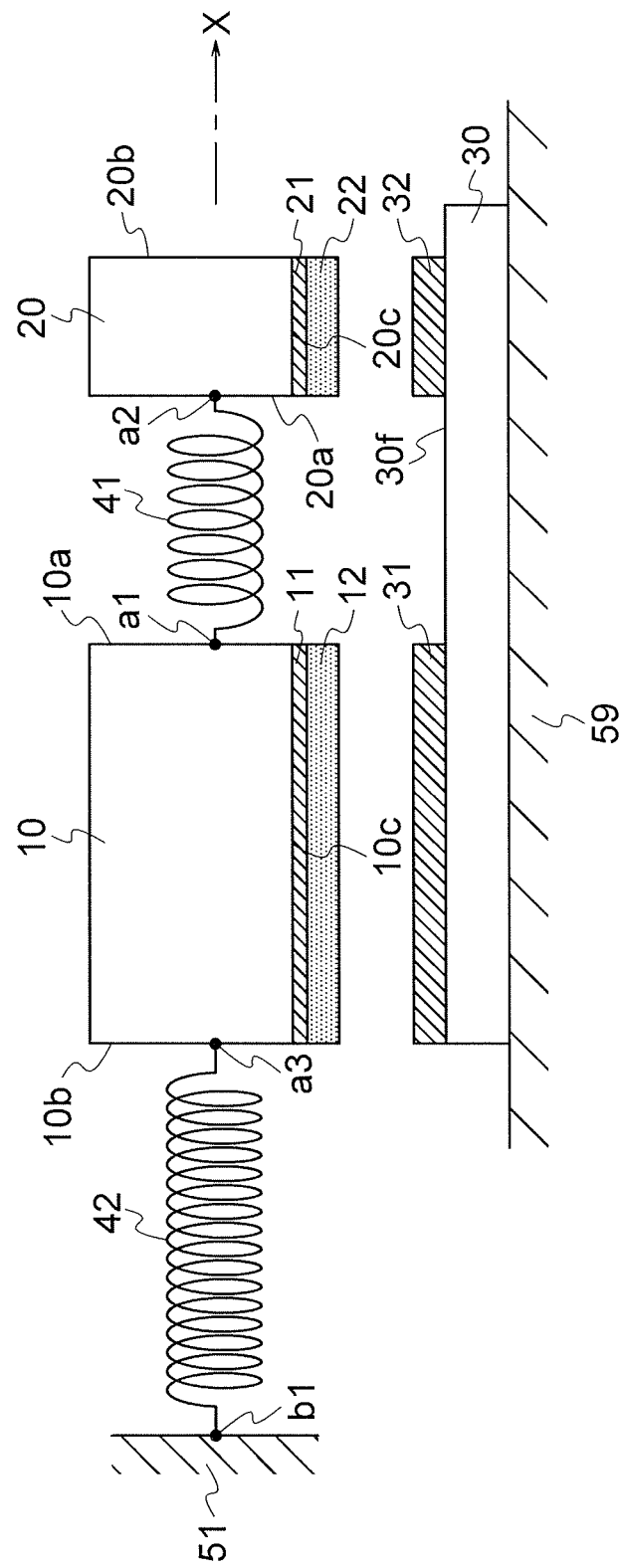

FIG. 6 is a plan view of a power generating element according to a modification 3 of the first embodiment.

Figure 7:
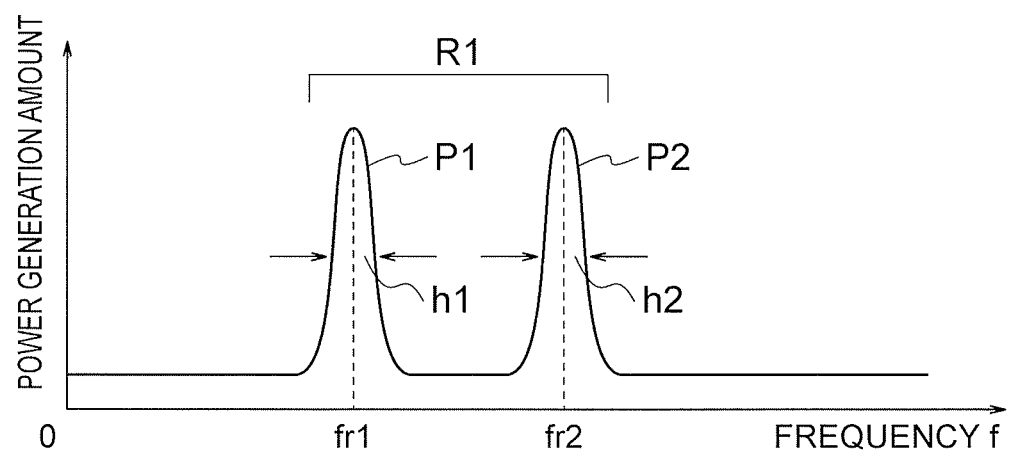

FIG. 7 is a graph showing a frequency characteristic of a power generation amount of the power generating element according to the modification 3 of the first embodiment.

Figure 8:
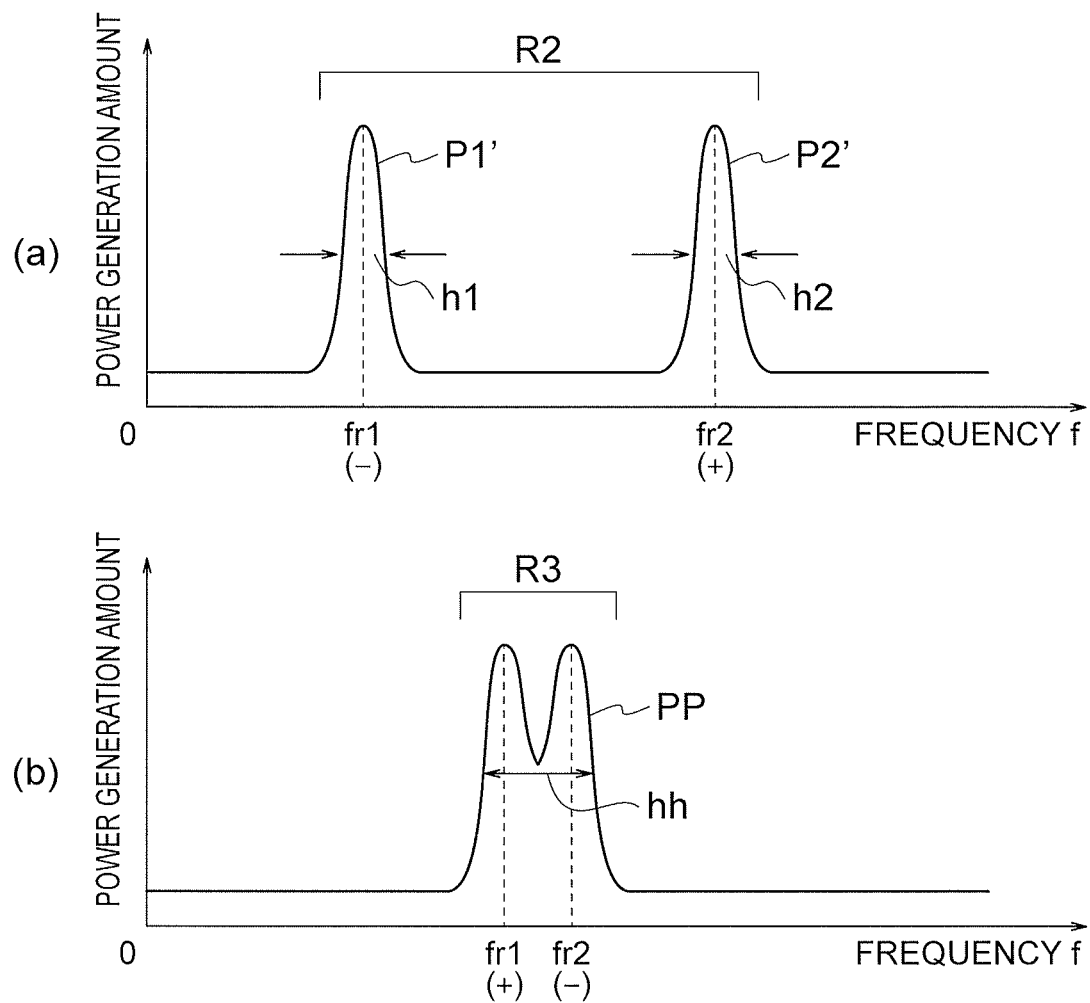

FIGS. 8(a) and (b) are graphs showing a frequency characteristic of a power generation amount after a power generation amount of the entire power generating element according to the first embodiment is adjusted.

Figure 9:
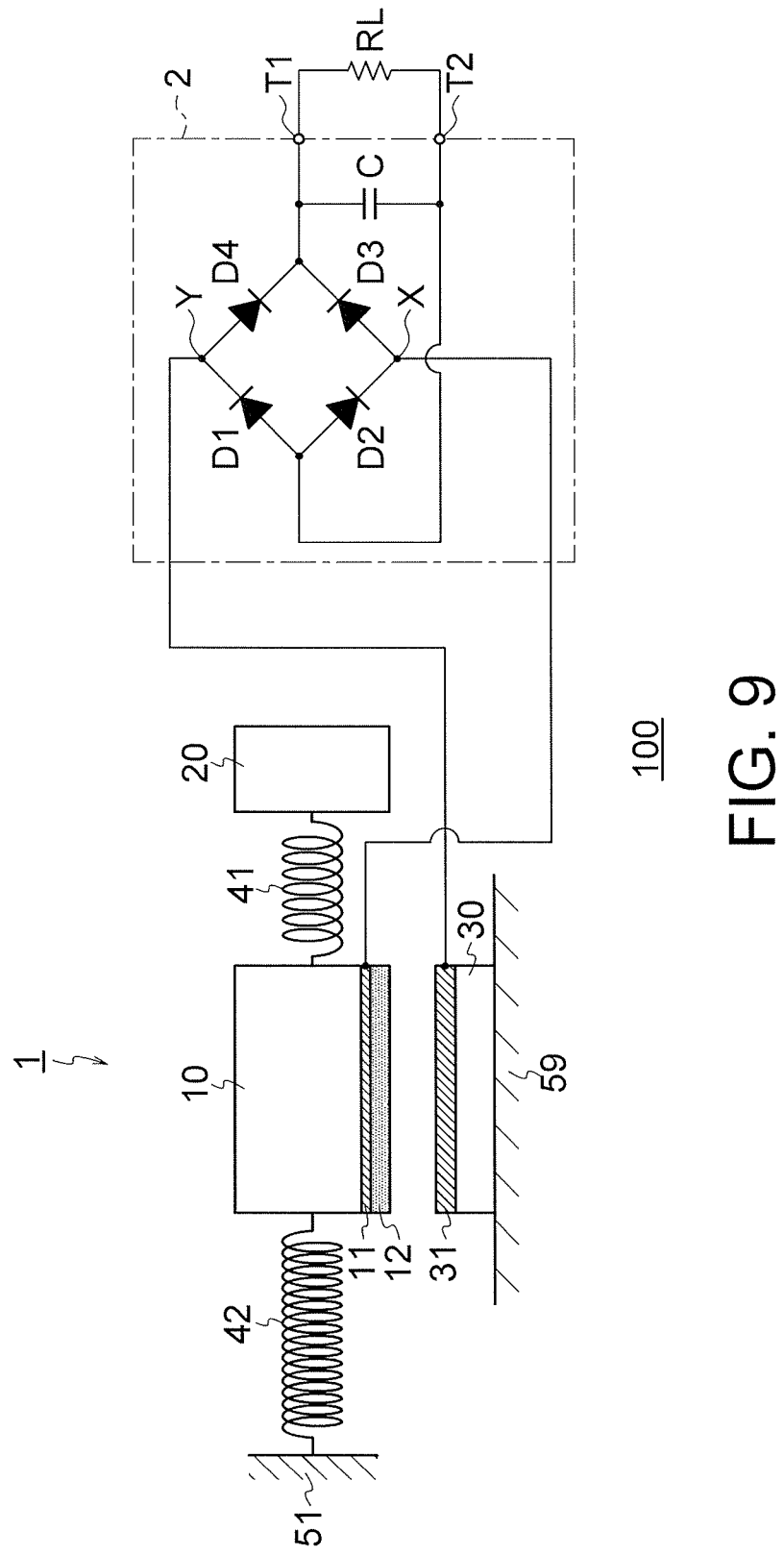

FIG. 9 is a diagram showing a schematic configuration of a power generating device including the power generating element according to the first embodiment.

Figure 10:
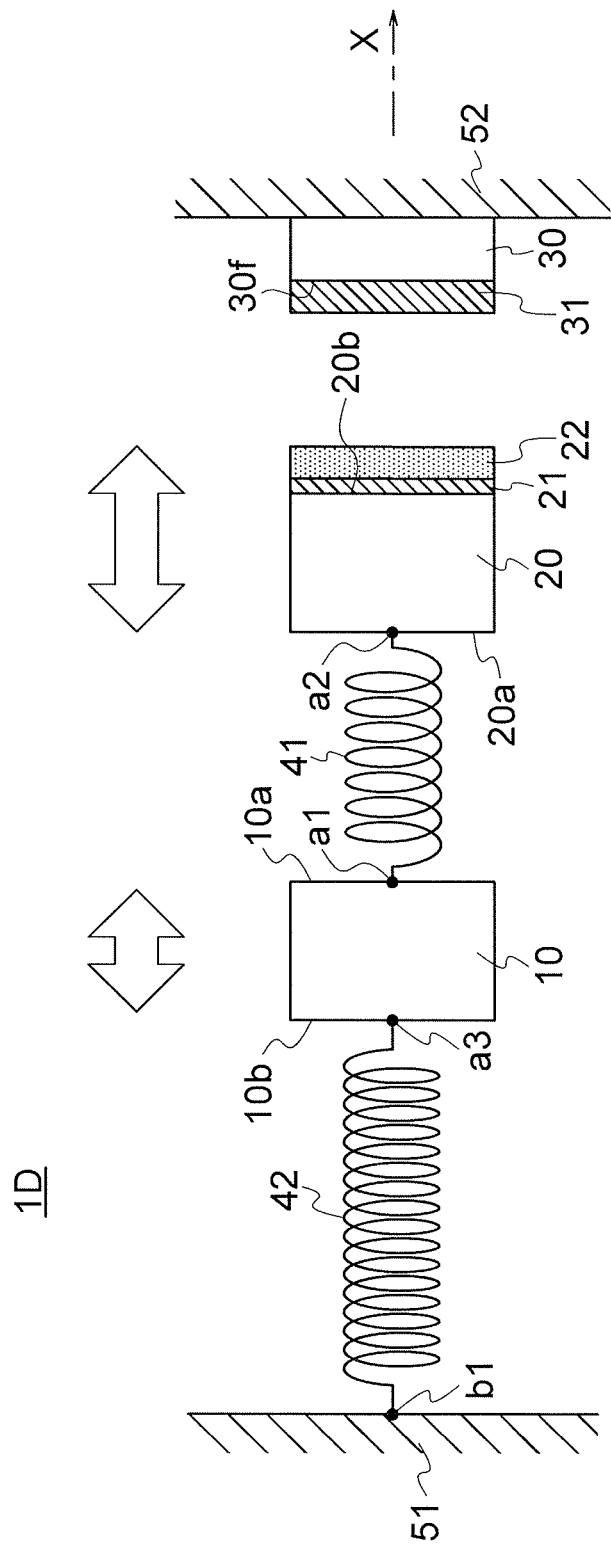

FIG. 10 is a plan view of a power generating element according to a second embodiment.

Figure 11:
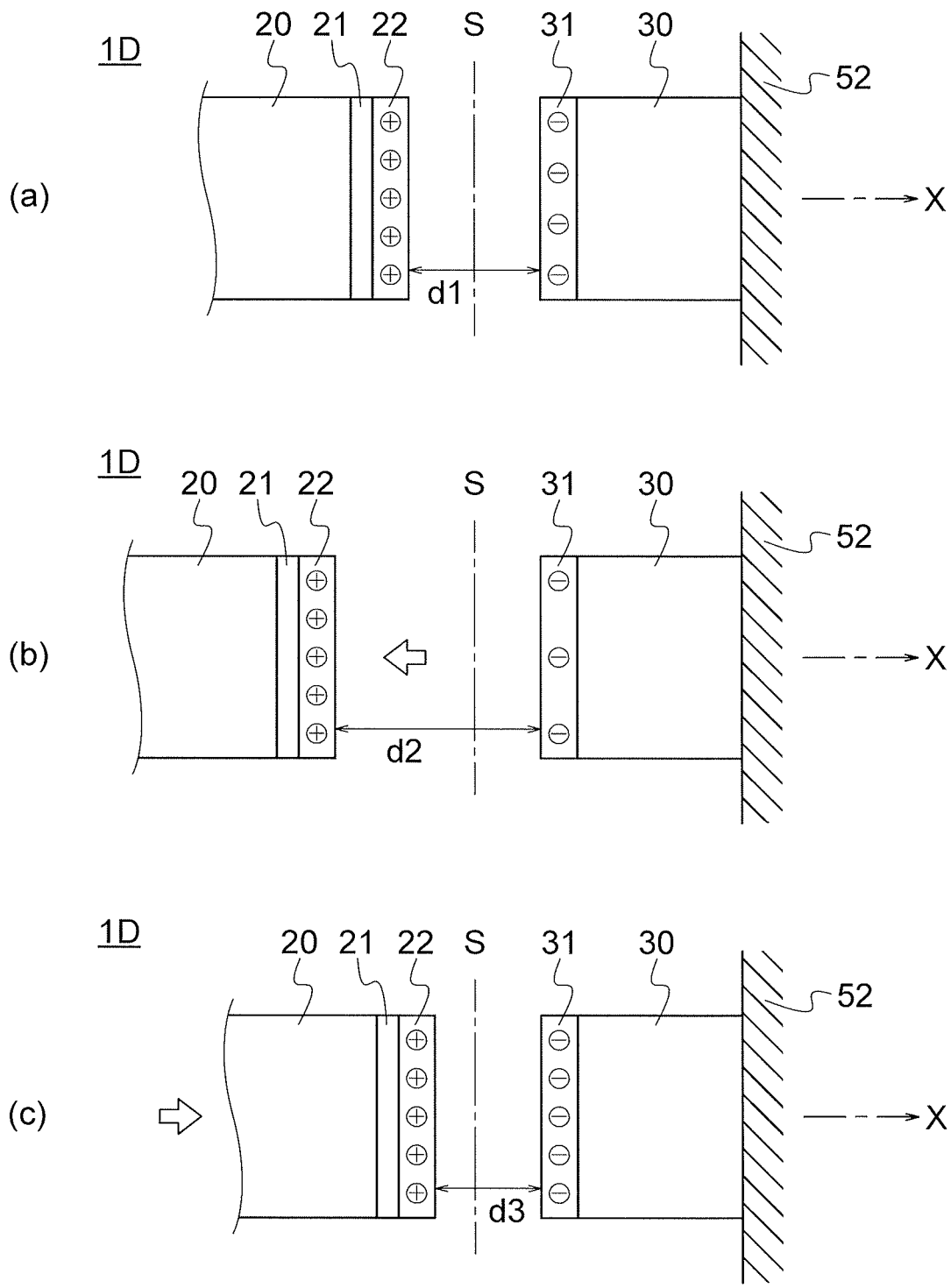

FIG. 11 is a diagram for explaining a power generation principle of the power generating element according to the second embodiment.

Figure 12:
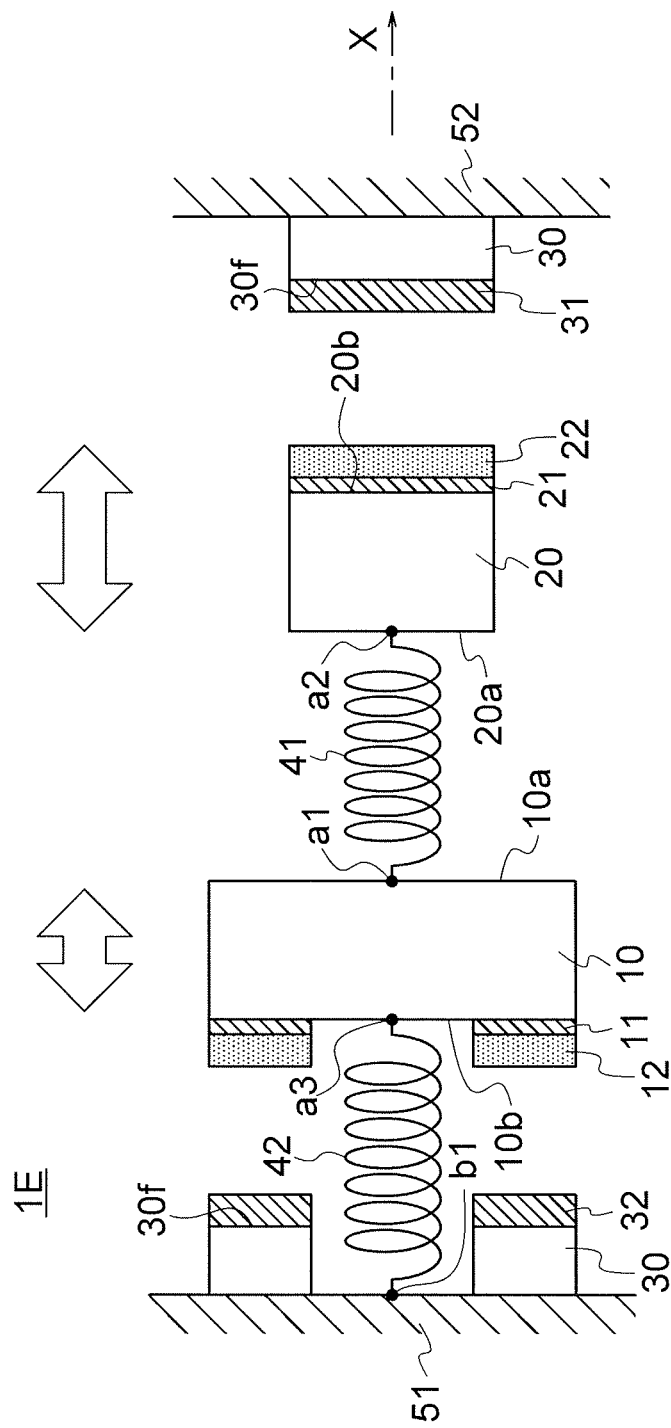

FIG. 12 is a plan view of a power generating element according to a modification 1 of the second embodiment.

Figure 13:
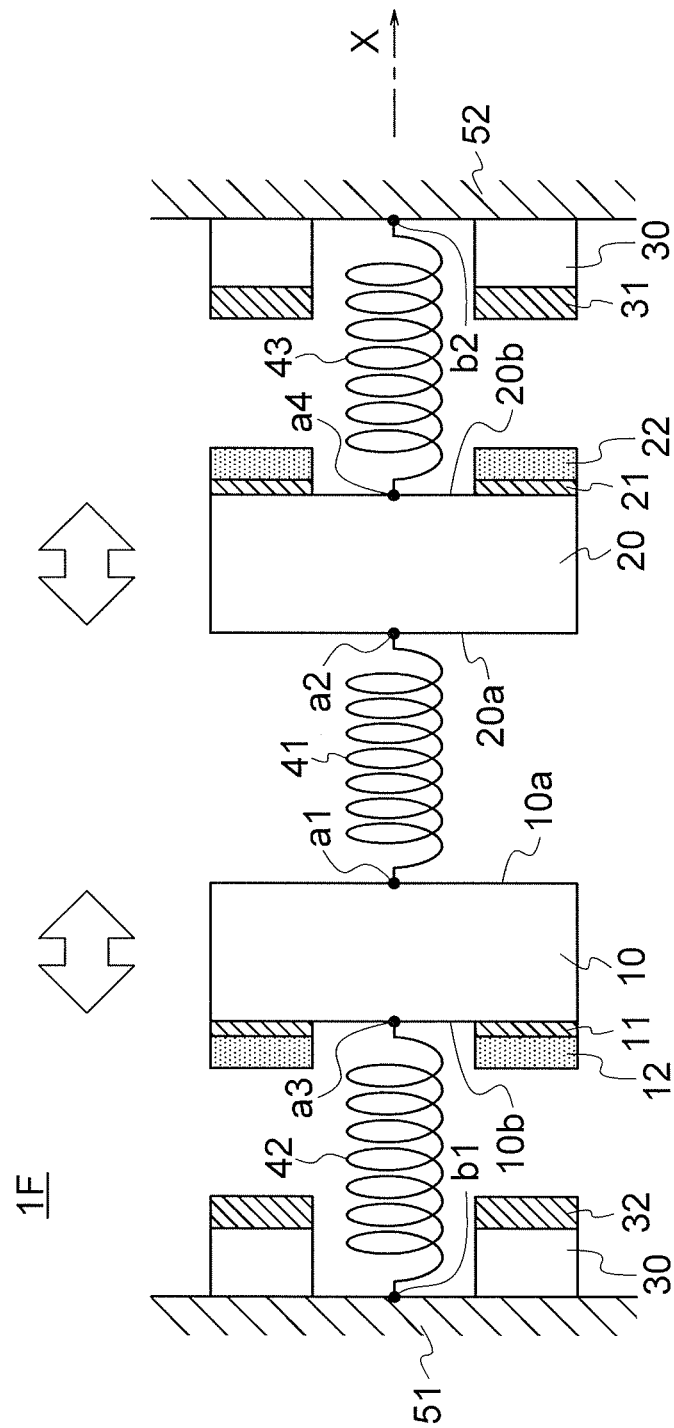

FIG. 13 is a plan view of a power generating element according to a modification 2 of the second embodiment.

Figure 14:
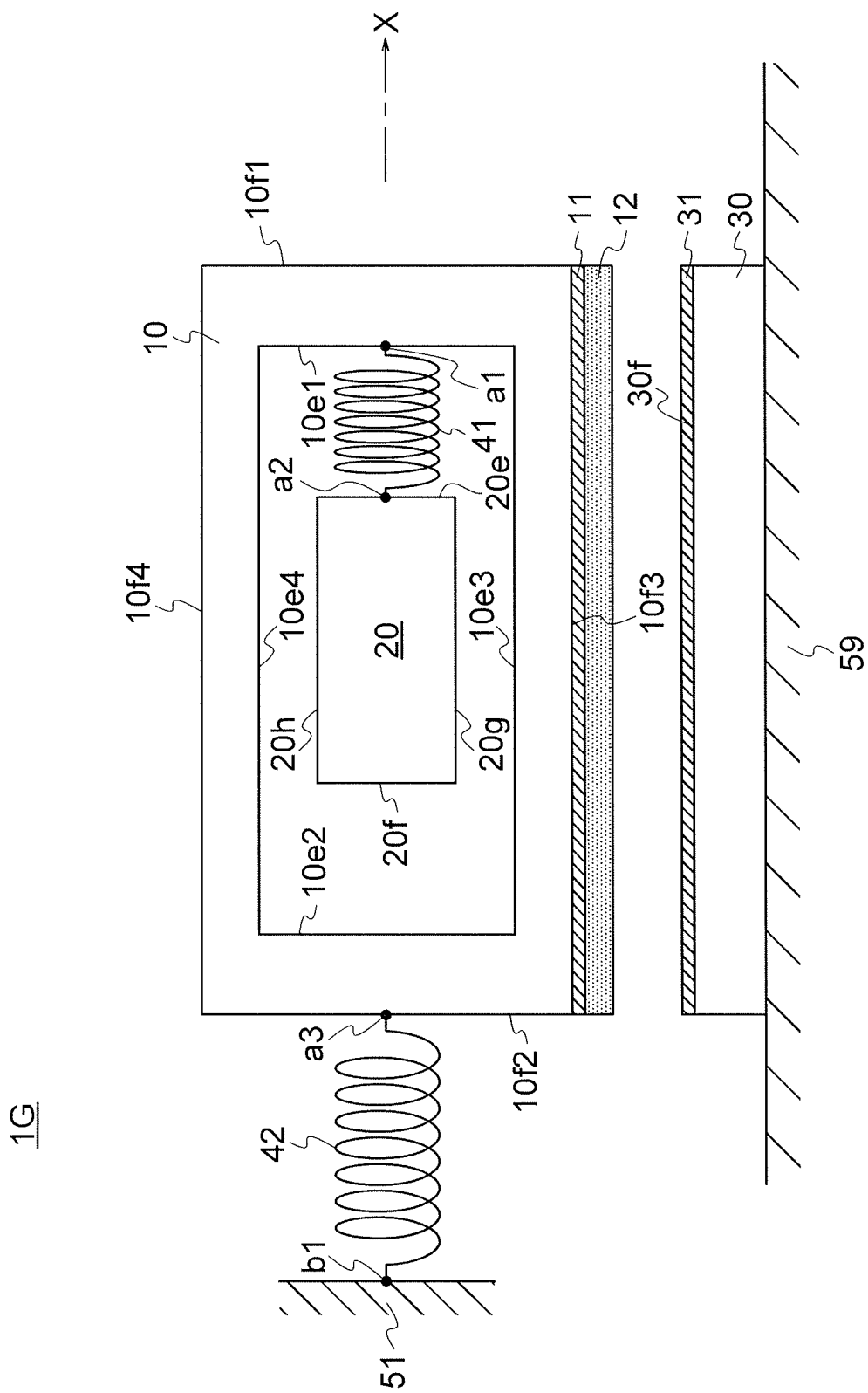

FIG. 14 is a plan view of a power generating element according to a third embodiment.

Figure 15:
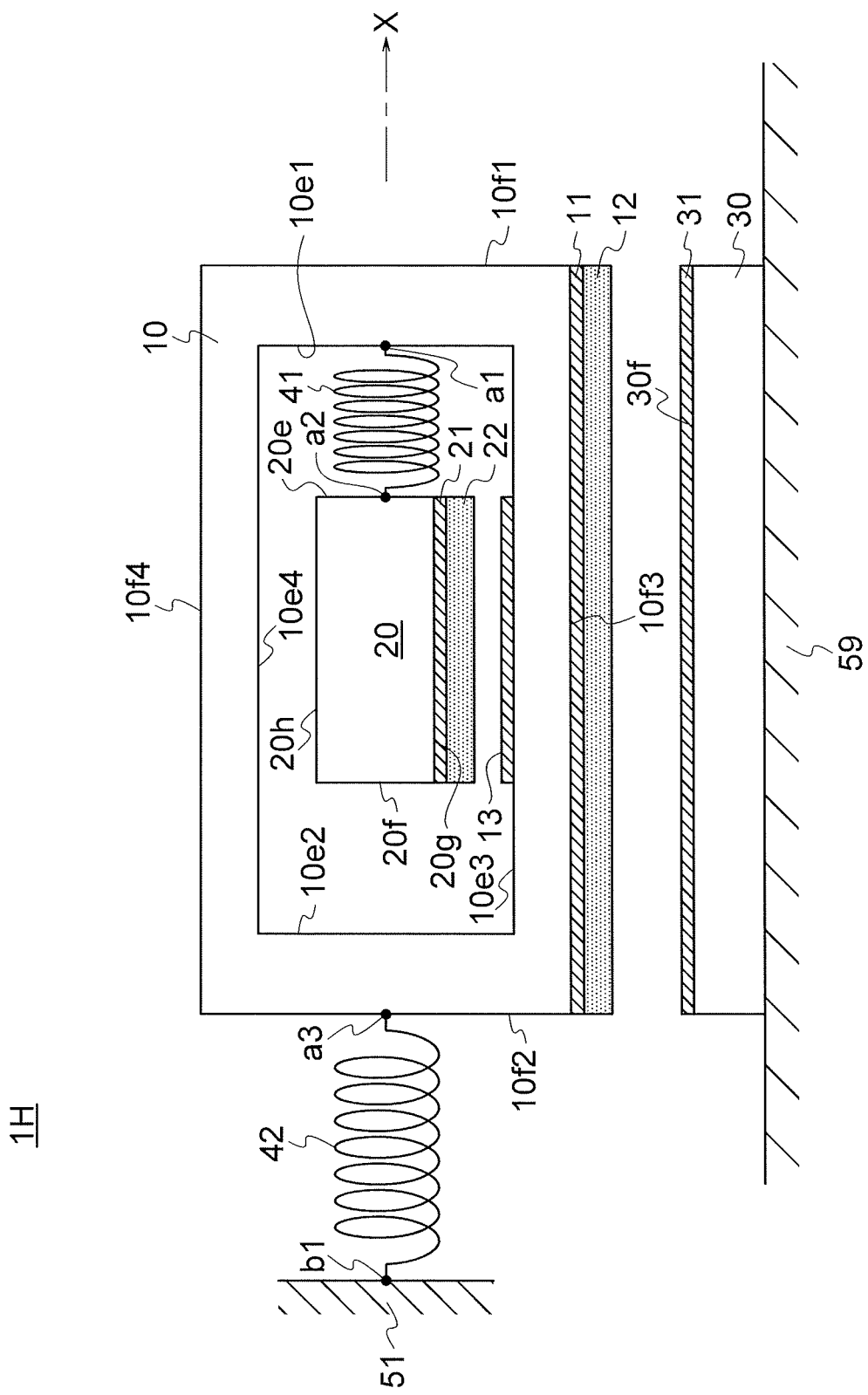

FIG. 15 is a plan view of a power generating element according to a modification 1 of the third embodiment.

Figure 16:
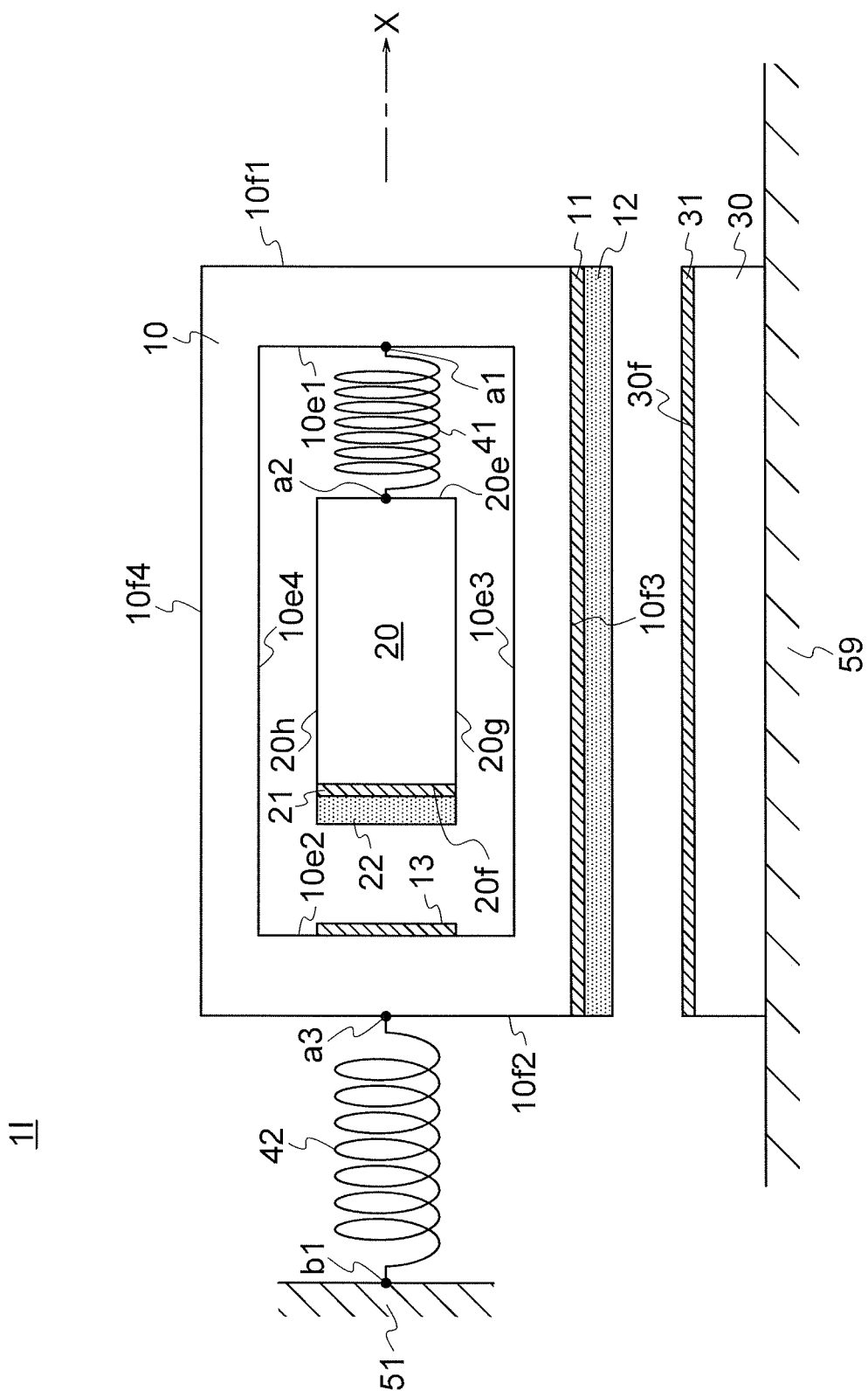

FIG. 16 is a plan view of a power generating element according to a modification 2 of the third embodiment.

Figure 17:
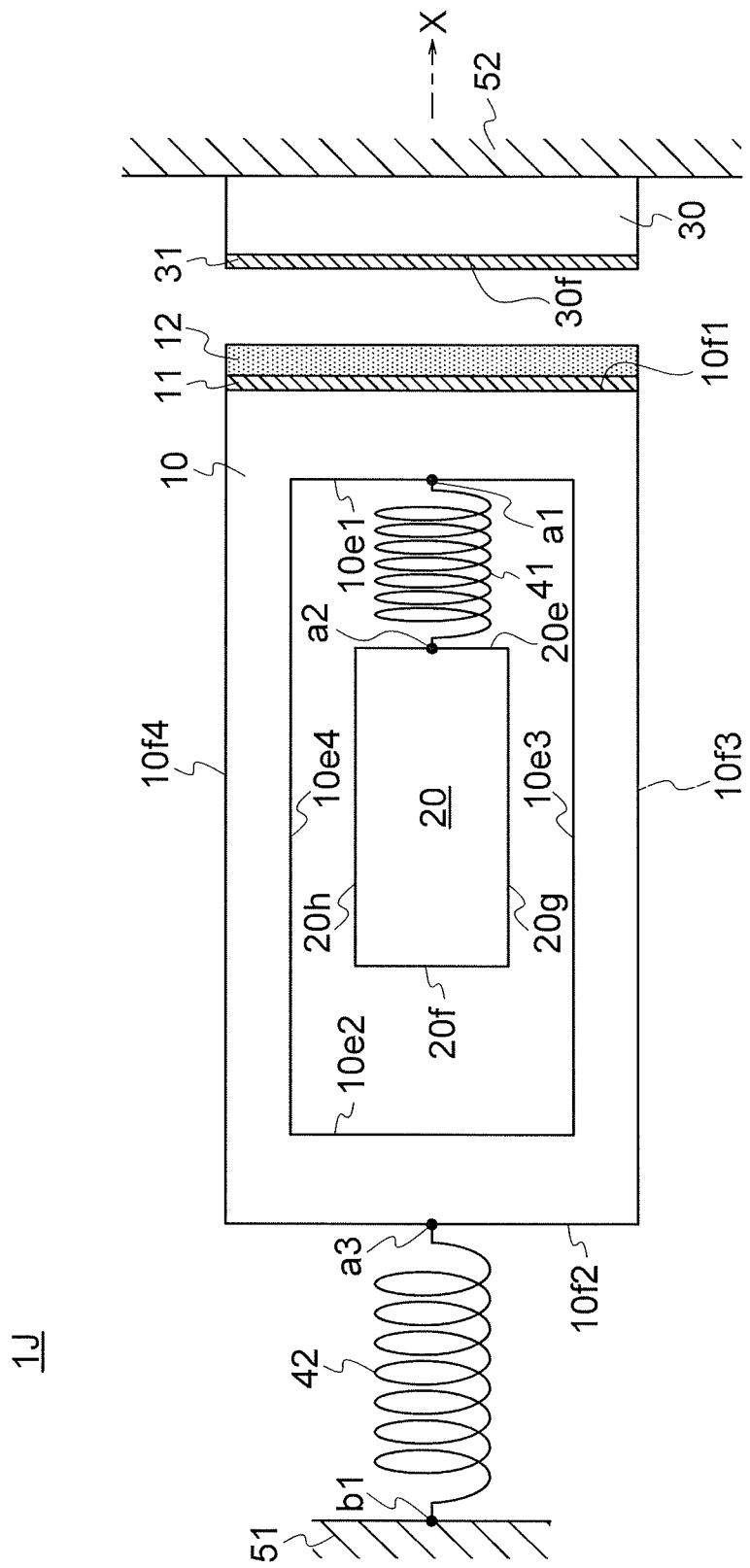

FIG. 17 is a plan view of a power generating element according to a fourth embodiment.

Figure 18:
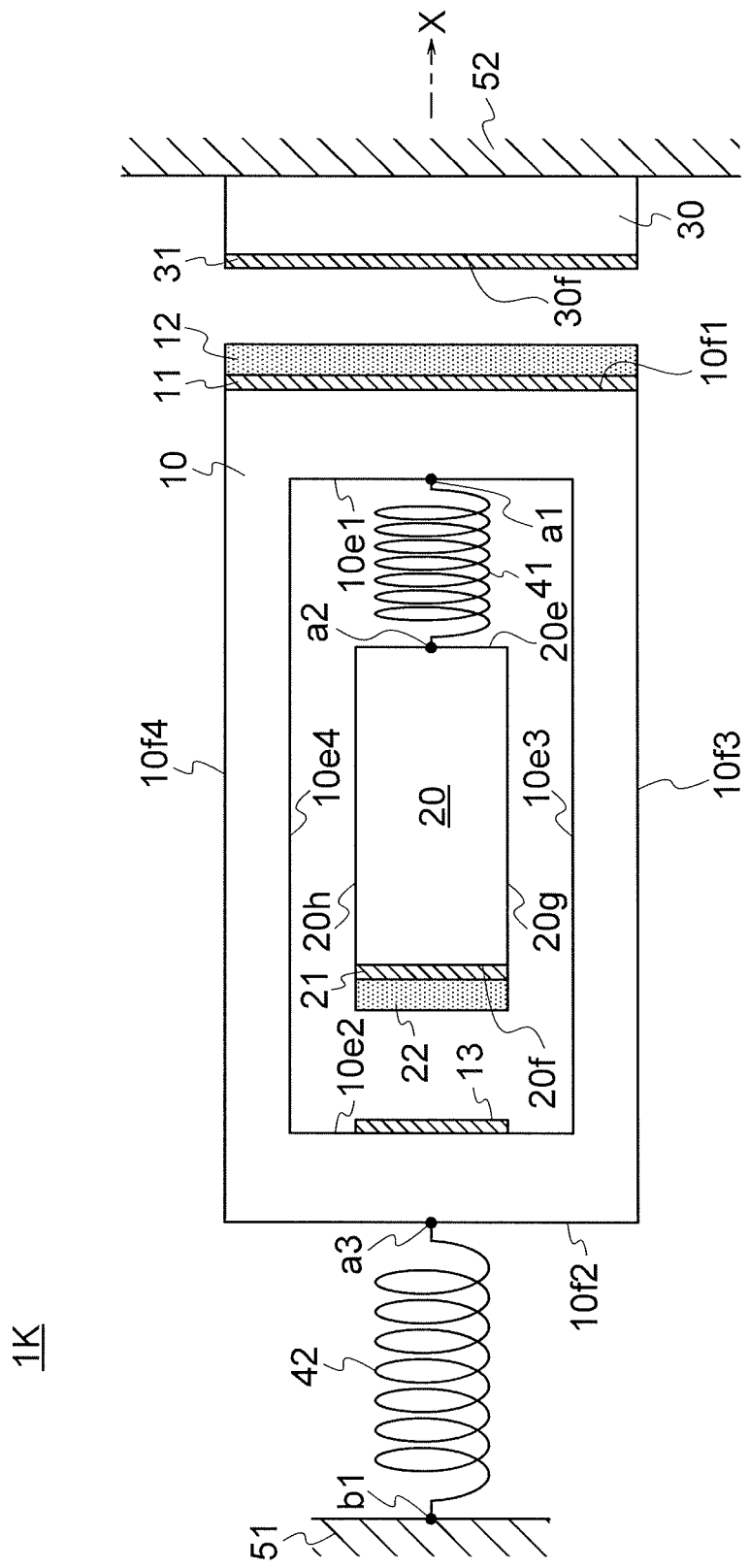

FIG. 18 is a plan view of a power generating element according to a modification 1 of the fourth embodiment.

Figure 19:
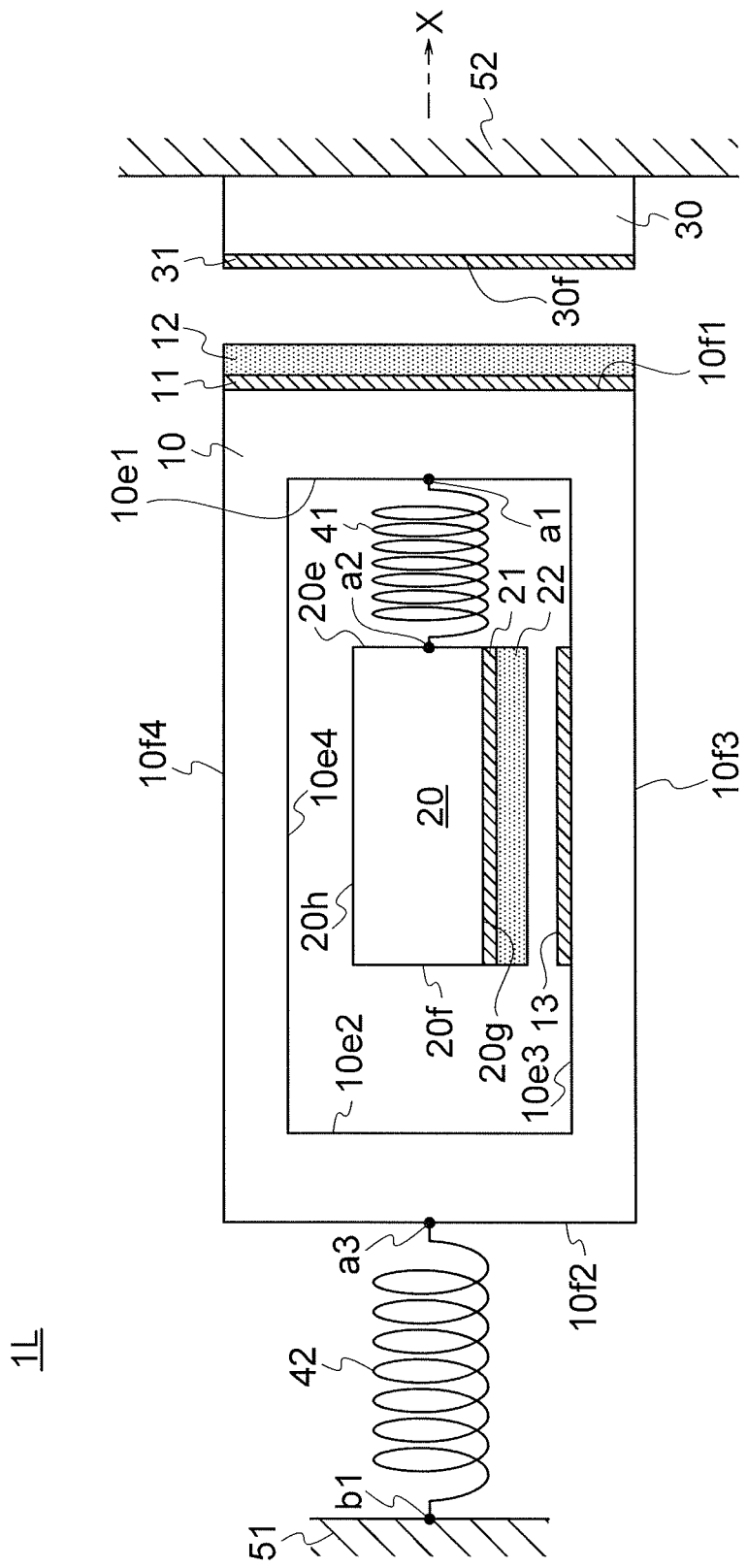

FIG. 19 is a plan view of a power generating element according to a modification 2 of the fourth embodiment.

Figure 20:
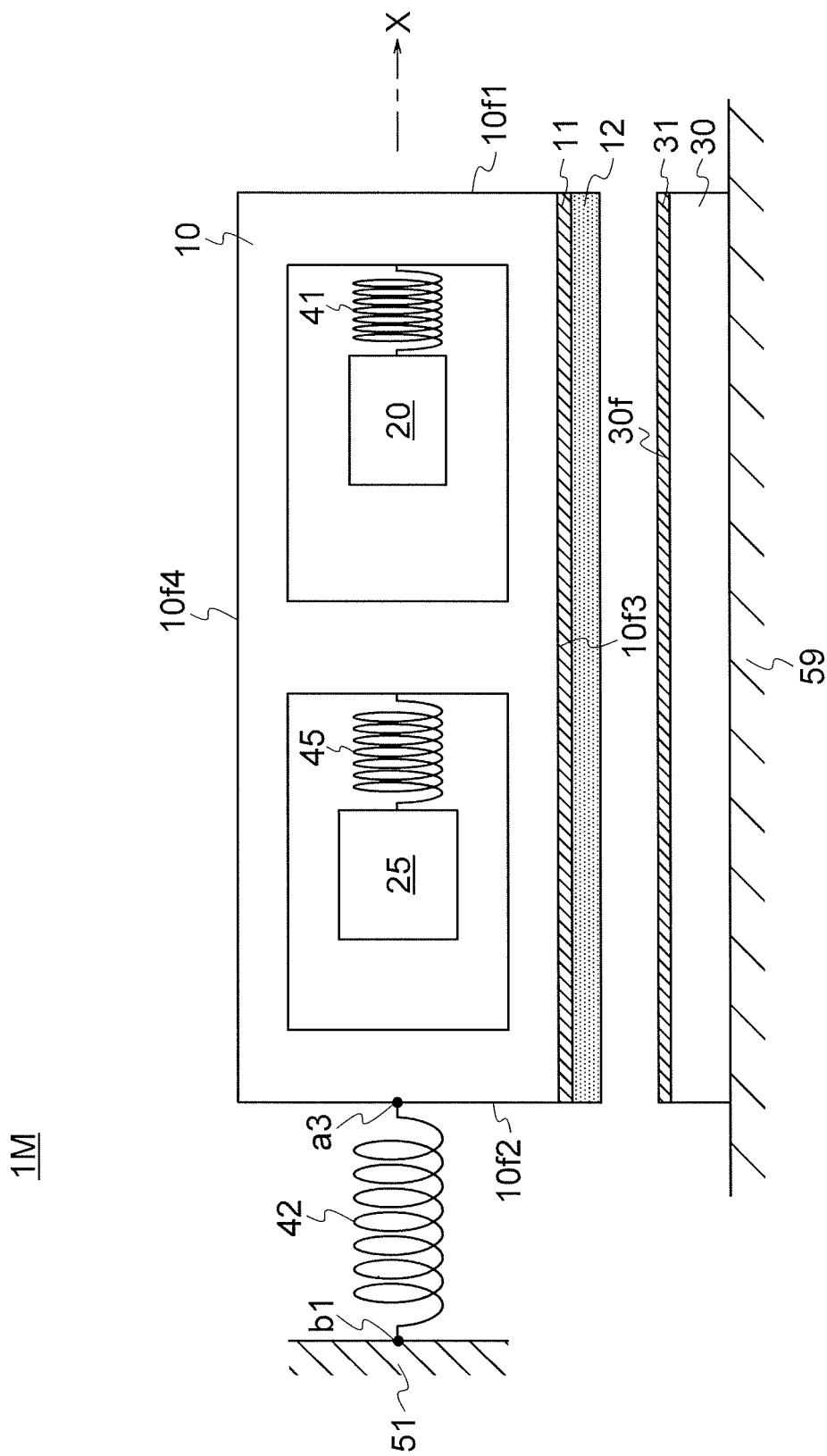

FIG. 20 is a plan view of a power generating element according to a fifth embodiment.

FIG. 21(a) is a plan view of a power generating element according to a sixth embodiment and FIG. 21(b) is a sectional view taken along an X axis of FIG. 21(a).

Figure 21:
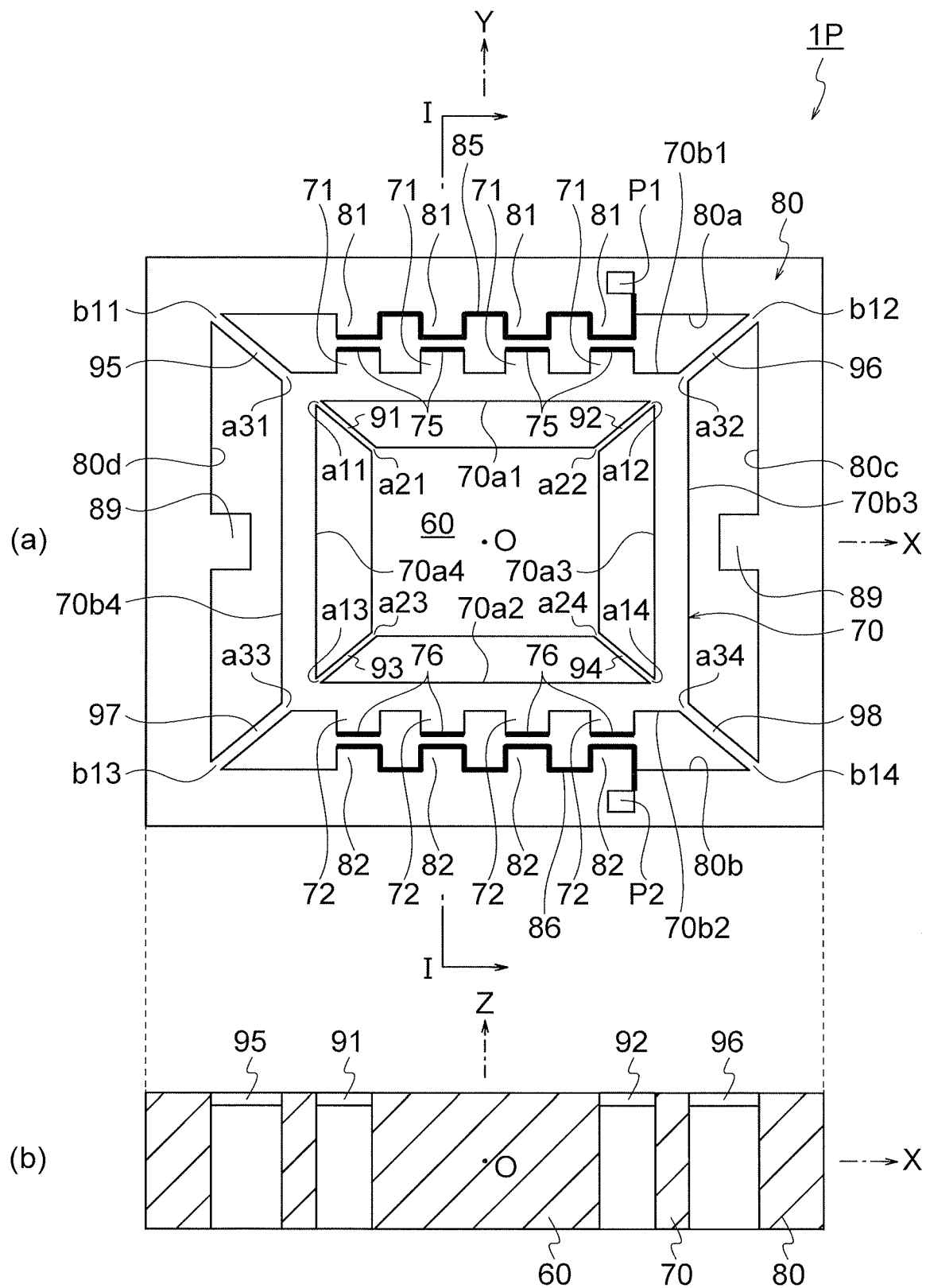
Figures 22, 23:
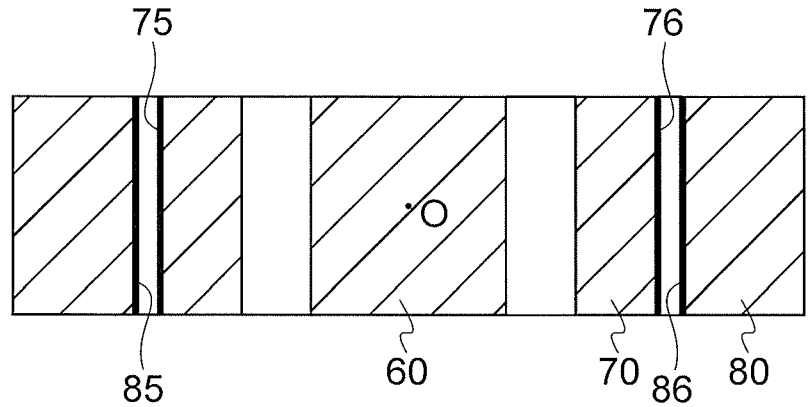

FIG. 22 is a sectional view taken along a I-I line of FIG. 21(a).

FIG. 23 is a diagram of a summary of specific methods for adjusting a resonant frequency of a displacement member.

Figure 24:
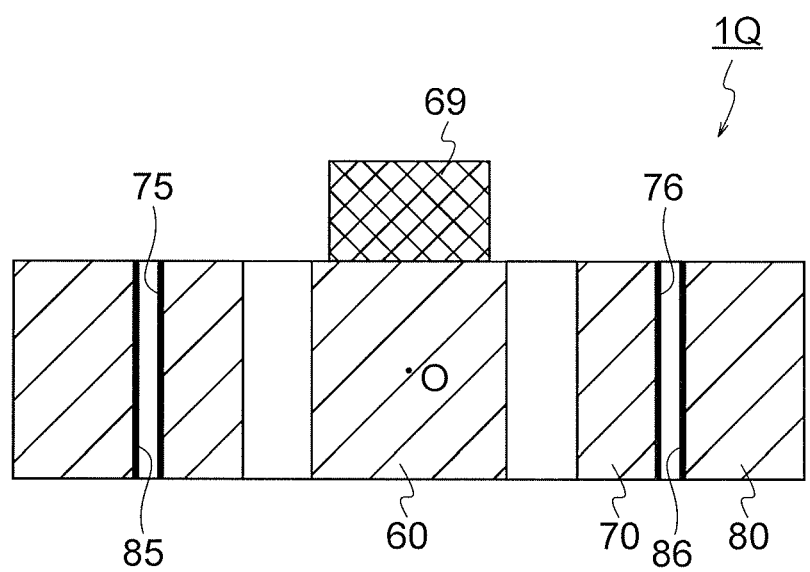

FIG. 24 is a sectional view of a power generating element according to a modification of a sixth embodiment.

Figure 25:
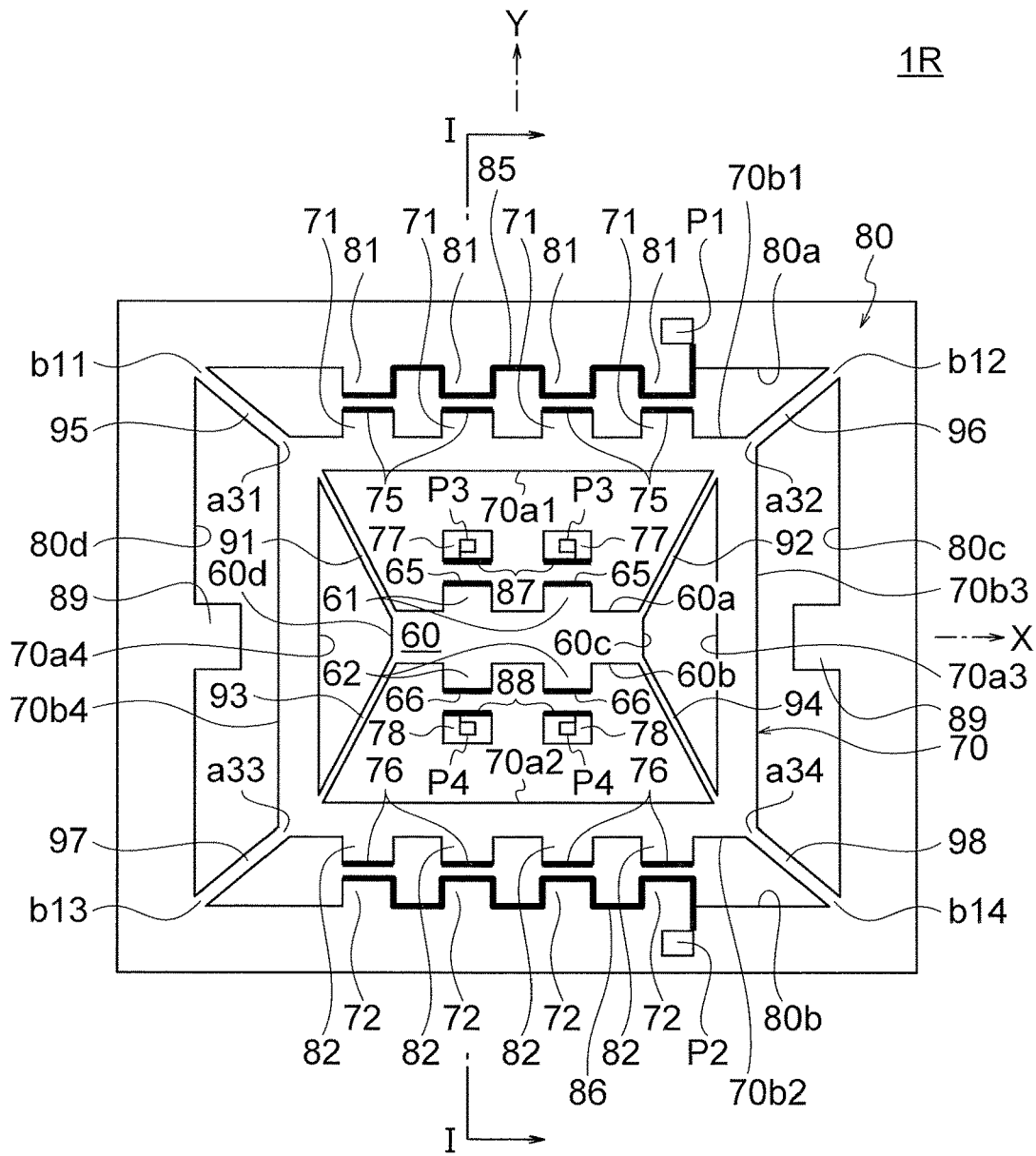

FIG. 25 is a plan view of a power generating element according to a seventh embodiment.

Figure 26:
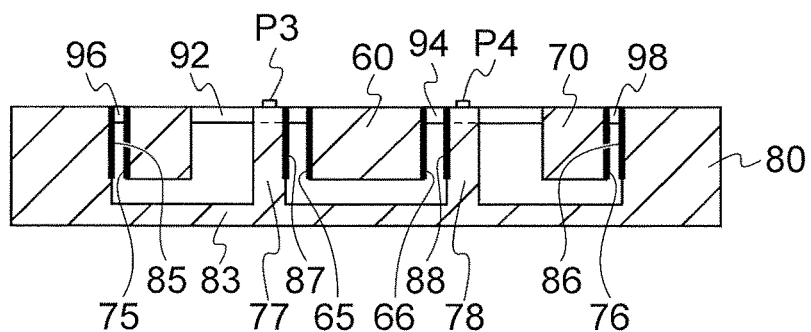

FIG. 26 is a sectional view taken along a I-I line of FIG. 25.

DESCRIPTION OF EMBODIMENTS

Electret power generating elements and power generating devices according to embodiments of the present invention are explained below with reference to the drawings. Note that, in the figures, components having equivalent functions are denoted by the same reference numerals and signs.

First Embodiment

Figure 1:
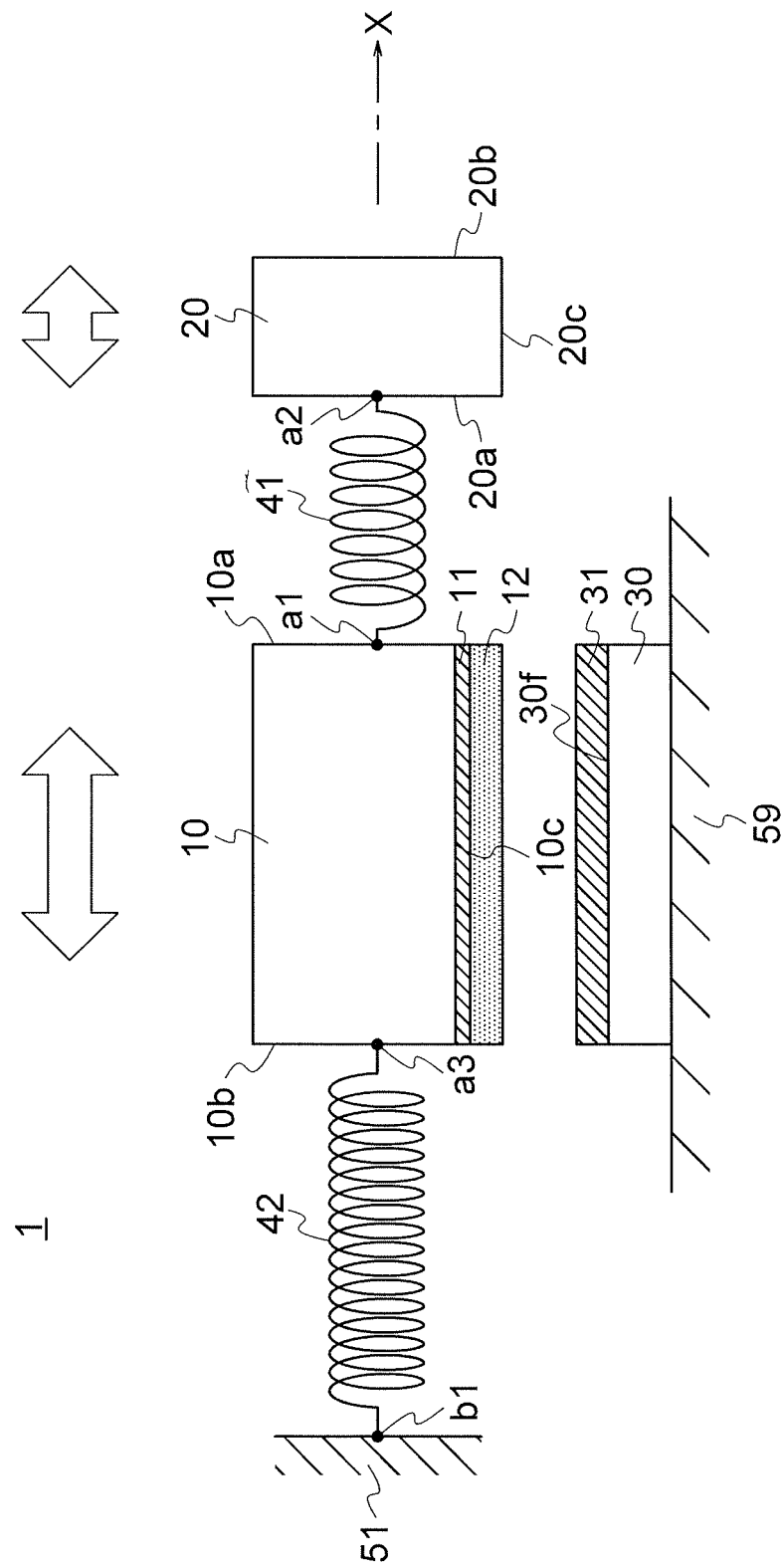
FIG. 1 is a plan view of a power generating element according to a first embodiment.

A power generating element 1 according to a first embodiment of the present invention is explained with reference to FIG. 1. FIG. 1 is a plan view of the power generating element according to this embodiment.

The power generating element 1 includes, as shown in FIG. 1, a displacement member 10 (a first displacement member), a displacement member 20 (a second displacement member), and a fixed member 30. As explained below, a two-degree-of-freedom vibration system is formed in the power generating element 1.

In this embodiment, the displacement members 10 and 20 and the fixed member 30 have rectangular parallelepiped shapes. However, the displacement members 10 and 20 and the fixed member 30 may have shapes other than the rectangular parallelepipeds. The displacement members 10 and 20 and the fixed member 30 are configured by insulators but may be configured by conductors.

The displacement member 10 and the displacement member 20 are connected via an elastic deformation body 41 (a first elastic deformation body). The displacement member 10 is connected to an attachment section 51 via an elastic deformation body 42 (a second elastic deformation body). Both the elastic deformation bodies 41 and 42 expand and contract in an X-axis direction. The displacement members 10 and 20 are displaceable in the X-axis direction according to elastic deformation of the elastic deformation bodies 41 and 42. Note that the elastic deformation bodies 41 and 42 are not limited to helical springs as shown in FIG. 1 as long as the elastic deformation bodies 41 and 42 are elastically deformed.

One end of the elastic deformation body 41 is connected to a displacement support point a1 (a first displacement support point) provided in the displacement member 10. The other end of the elastic deformation body 41 is connected to a displacement support point a2 (a second displacement support point) provided in the displacement member 20.

One end of the elastic deformation body 42 is connected to a displacement support point a3 (a third displacement support point) provided in the displacement member 10. The other end of the elastic deformation body 42 is connected to a fixed support point b1 (a first fixed support point) provided in the attachment section 51.

The displacement member 10 includes a displacement surface 10a (a first displacement surface) facing the displacement member 20 side, a displacement surface 10b (a second displacement surface) on the opposite side of this displacement surface 10a, and a connection surface 10c (a first connection surface). The connection surface 10c is a surface that connects the displacement surface 10a and the displacement surface 10b.

The displacement member 20 includes a displacement surface 20a (a third displacement surface) opposed to the displacement surface 10a of the displacement member 10, a displacement surface 20b (a fourth displacement surface) on the opposite side of this displacement surface 20a, and a connection surface 20c (a second connection surface). The connection surface 20c connects the displacement surface 20a and the displacement surface 20b.

As shown in FIG. 1, an electret material layer 12 is provided on the connection surface 10c of the displacement member 10 via an electret electrode layer 11. That is, the electret electrode layer 11 is formed on the connection surface 10c. The electret material layer 12 is formed on the electret electrode layer 11. In this way, the electret electrode layer 11 is provided in a lower layer of the electret material layer 12.

The electret electrode layer 11 is configured from a conductor such as copper or aluminum. The electret material layer 12 is configured from an electret material. In this embodiment, the electret material layer 12 is positively charged. However, the electret material layer 12 may be negatively charged.

As the electret material configuring the electret material layer 12, a publicly-known polymeric charge retaining material or inorganic charge retaining material can be used. In the case of the polymeric charge retaining material, for example, polypropylene and polyethylene terephthalate are applicable. In the case of the inorganic charge retaining material, for example, a silicon oxide and a silicon nitride are applicable.

The fixed member 30 is attached to an attachment section 59. The attachment section 59 may be connected or may not be connected to the attachment section 51. As shown in FIG. 1, the fixed member 30 includes an opposed surface 30f opposed to the connection surface 10c of the displacement member 10. A counter electrode layer 31 opposed to the electret material layer 12 is formed on this opposed surface 30f. This counter electrode layer 31 is configured from a conductor such as copper or aluminum.

The displacement member 10 and the fixed member 30 are disposed in parallel to each other such that the connection surface 10c of the displacement member 10 and the opposed surface 30f of the fixed member 30 are opposed.

Note that, from the viewpoint of power generation efficiency, plane areas of the electret material layer 12 and the counter electrode layer 31 are desirably substantially equal as shown in FIG. 1.

In this application, a surface contributing to power generation is referred to as power generation surface. An electret material layer or a counter electrode layer is provided on the power generation surface. As this power generation surface, there are a first power generation surface and a second power generation surface opposed to each other. In the first embodiment, the connection surface 10c of the displacement member 10 configures the first power generation surface. The opposed surface 30f of the fixed member 30 configures the second power generation surface.

Figure 2:
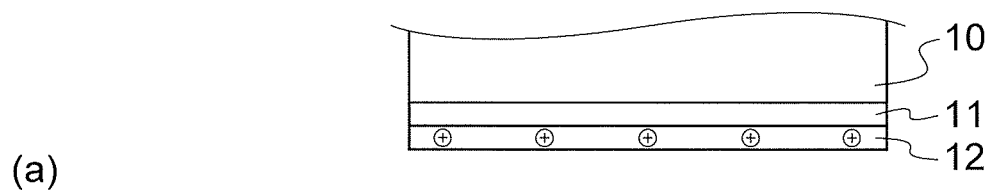
FIG. 2 is a diagram for explaining a power generation principle of the power generating element according to the first embodiment.
Figure 2:
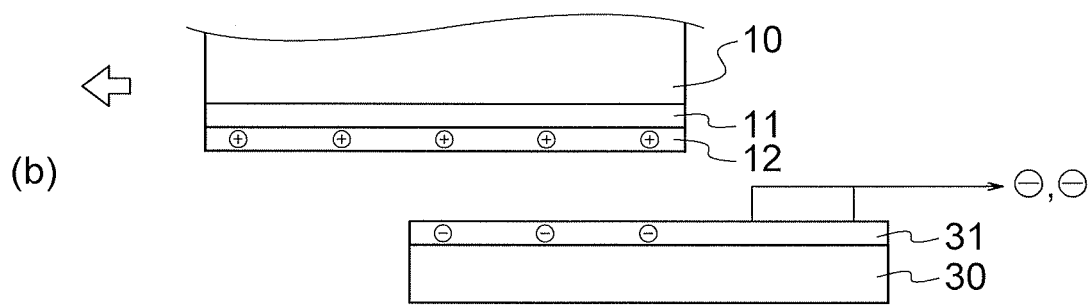
Figure 2:
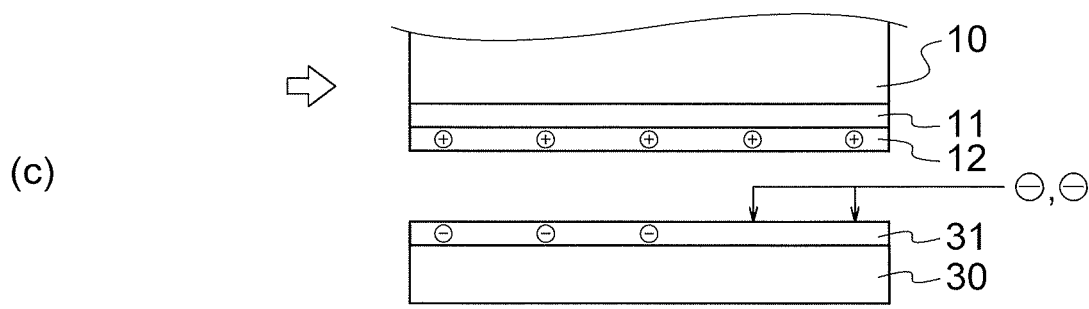
Figure 3:
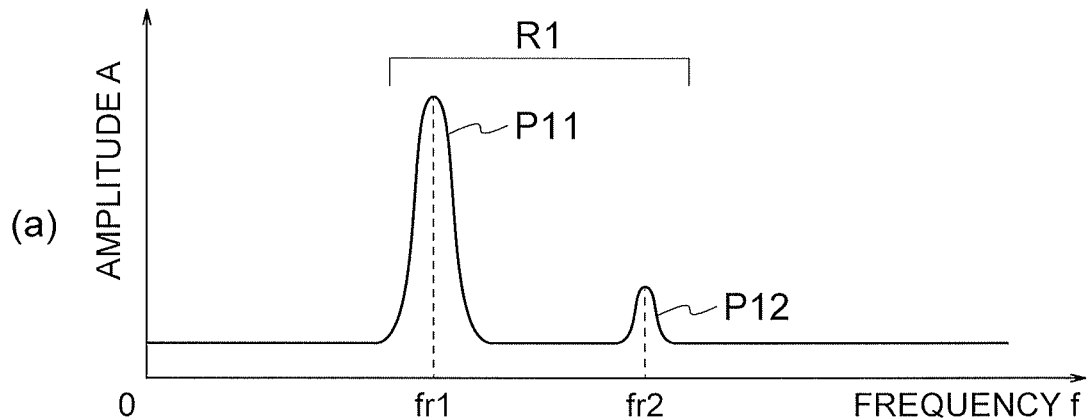
FIG. 3(a) is a graph showing a frequency characteristic of vibration of a displacement member 10 in the power generating element according to the first embodiment and FIG.
Figure 3:
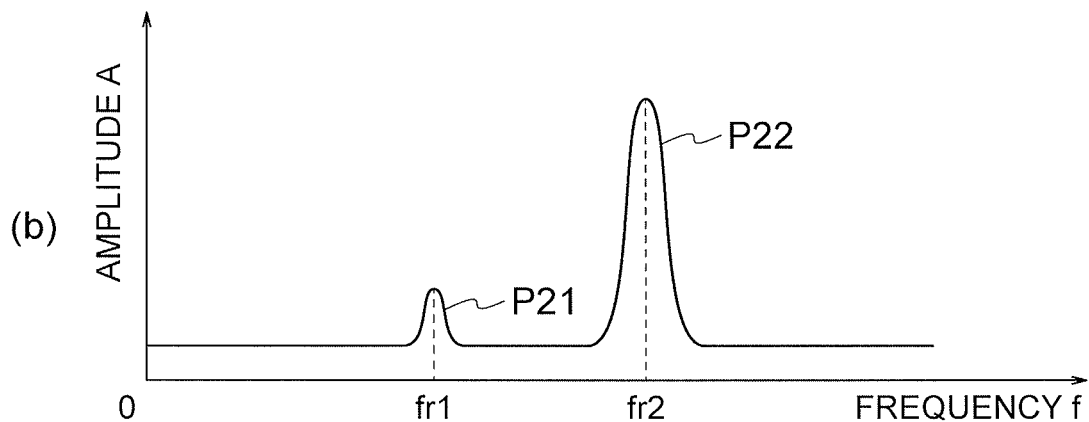

The operation of the power generating element 1 according to this embodiment is explained with reference to FIGS. 2(a), (b), and (c) and FIGS. 3(a) and (b). FIGS. 2(a), (b), and (c) are diagrams for explaining a power generation principle of the power generating element 1 according to this embodiment. FIG. 2(a) shows a state in which the displacement member 10 is not displaced with respect to the fixed member 30. FIG. 2(b) shows a state in which vibration energy is given to the power generating element 1 and the displacement member 10 is displaced with respect to the fixed member 30. FIG. 2(c) shows a state in which the displacement member 10 returns to an original position with restoration forces of the elastic deformation bodies 41 and 42. FIG. 3(a) is a graph showing a frequency characteristic of vibration of the displacement member 10. FIG. 3(b) is a graph showing a frequency characteristic of vibration of the displacement member 20.

As shown in FIG. 2(a), in the state in which the displacement member 10 is not displaced with respect to the fixed member 30, negative electric charges (electrons) of an amount corresponding to positive electric charges accumulated in the electret material layer 12 are induced to the counter electrode layer 31. Note that, when the electret material layer 12 is negatively charged, positive electric charges are inducted to the counter electrode layer 31. In the following explanation of this specification, unless specifically noted otherwise, the positive electric charges or the negative electric charges induced to the counter electrode layer by the electric charges of the electret material layer are collectively simply referred to as "electric charges".

As shown in FIG. 2(b), in the state in which the displacement member 10 is displaced with respect to the fixed member 30, a projection overlap area between the displacement member 10 and the fixed member 30 decreases. Therefore, a part of the negative electric charges of the counter electrode layer 31 are discharged to the outside.

In this specification, a projection overlap area between the first member and the second member means an area of a portion where the first member projected on the second member and the second member overlap (an overlapping area). The projection overlap area in this embodiment means an area of a portion where the displacement member 10 projected on the fixed member 30 and the fixed member 30 overlap.

As shown in FIG. 2(c), in the state in which the displacement member 10 returns to the original position, the projection overlap area between the displacement member 10 and the fixed member 30 returns to original size. Therefore, negative electric charges flow into the counter electrode layer 31 from the outside. Negative electrode charges accumulated in the counter electrode layer 31 are restored.

When the displacement member 10 is displaced and the projection overlap area between the displacement member 10 and the fixed member 30 decreases as explained above, electric charges electrostatically induced to the counter electrode layer 31 are discharged to the outside of the power generating element 1. On the other hand, when the projection overlap area between the displacement member 10 and the fixed member 30 increases, electric charges are taken into the counter electrode layer 31 from the outside of the power generating element 1. When the power generating element 1 receives vibration energy, the displacement member 10 vibrates in the X-axis direction according to elastic deformation of the elastic deformation bodies 41 and 42. The projection overlap area between the displacement member 10 and the fixed member 30 repeats an increase and a decrease. Consequently, the electric charges accumulated in the counter electrode layer 31 increases and decreases. As a result, the power generating element 1 can perform power generation.

In the power generating element 1, a two-degree-of-freedom vibration system is formed. That is, in the power generating element 1, a resonant system I involved in vibration of the displacement member 10 and a resonant system II involved in vibration of the displacement member 20 are configured. The resonant systems I and II are configured such that a resonant frequency of the resonant system I and a resonant frequency of the resonant system II are different. In this way, the power generating element 1 includes a plurality of resonant frequencies. Therefore, according to this embodiment, it is possible to expand a power generation frequency band. The expansion of the power generation frequency band is explained more in detail below.

FIG. 3(a) shows a frequency characteristic indicating the amplitude of the displacement member 10. A large peak waveform P11 appears in a frequency value fr1. A small peak waveform P12 appears in a frequency value fr2. On the other hand, FIG. 3(b) shows a frequency characteristic indicating the amplitude of the displacement member 20. A large peak waveform P22 appears in the frequency value fr2. A small peak waveform P21 appears in the frequency value fr1. Here, the frequency value fr1 is a resonant frequency of the resonant system I and the frequency fr2 is a resonant frequency of the resonant system II.

When vibration is given to the power generating element 1 from the outside and the frequency of this external vibration is gradually increased from a lower frequency, a phenomenon explained below is observed. First, when the frequency of the external vibration reaches the resonant frequency fr1 of the resonant system I, as indicated by the peak waveform P11 in FIG. 3(a), vibration amplitude of the displacement member 10 suddenly increases. At this time, vibration of the displacement member 20 increases as well while being affected by the vibration of the displacement member 10. The small peak waveform P21 shown in FIG. 3(b) is a peak waveform generated while being affected by the displacement member 10 in this way. When the external vibration having the resonant frequency fr1 is given to the power generating element 1 in this way, not only the amplitude of the displacement member 10 suddenly increases but also the amplitude of the displacement member 20 increases because of the influence of the sudden increase in the amplitude of the displacement member 10.

Subsequently, it is assumed that the frequency of the external vibration further increases from the resonant frequency fr1 and reaches the resonant frequency fr2 of the resonant system II. In this case, as indicated by the peak waveform P22 in FIG. 3(b), the amplitude of the displacement member 20 suddenly increases. At this time, the amplitude of the displacement member 10 also increases while being affected by the vibration of the displacement member 20. The small peak waveform P12 shown in FIG. 3(a) is a peak waveform generated while being affected in this way. In this way, when the external vibration having the resonant frequency fr2 is given to the power generating element 1, not only the amplitude of the displacement member 20 suddenly increases but also the amplitude of the displacement member 10 increases because of the influence of the sudden increase in the amplitude of the displacement member 20.

Note that the resonant frequencies fr1 and fr2 can be adjusted to desired values by adjusting at least either one of the masses of the displacement member 10 and the displacement member 20 and spring constants of the elastic deformation body 41 and the elastic deformation body 42.

In this way, when the external vibration having the resonant frequency fr1 is applied to the power generating element 1, vibration having the amplitude as indicated by the peak waveform P11 is generated in the displacement member 10. When the external vibration having the resonant frequency fr2 is applied to the power generating element 1, vibration having the amplitude as indicated by the peak waveform P12 is generated in the displacement member 10. Therefore, with the power generating element 1 according to this embodiment, it is possible to efficiently perform power generation when external vibration having a frequency near the resonant frequencies fr1 and fr2 is given. That is, it is possible to expand a frequency band capable of generating electric power to a degree of a frequency band R1 shown in FIG. 3(a). Therefore, according to the first embodiment, it is possible to expand the power generation frequency band.

Modifications 1, 2, and 3 related to this embodiment are explained. In all the modifications, it is possible to obtain the same effects as the effects in the first embodiment.

<Modification 1 of the First Embodiment>

The modification 1 of the first embodiment is explained with reference to FIG. 4. FIG. 4 is a plan view of a power generating element 1A according to this modification.

In the power generating element 1A according to this modification, as shown in FIG. 4, the displacement member 20 is connected to, via an elastic deformation body 43 (a third elastic deformation body), an attachment section 52 (a second attachment section) opposed to the attachment section 51. One end of the elastic deformation body 43 is connected to a displacement support point a4 (a fourth displacement support point) provided in the displacement member 20. The displacement support point a4 is provided on the displacement surface 20b. The other end of the elastic deformation body 43 is connected to a fixed support point b2 (a second fixed support point) provided in the attachment section 52.

According to this modification, it is possible to stably vibrate the displacement members 10 and 20 in the X-axis direction. Since the number of elastic deformation bodies increases from two to three, it is easy to adjust a resonant frequency to a desired value.

<Modification 2 of the First Embodiment>

A modification 2 of the first embodiment is explained with reference to FIG. 5. FIG. 5 is a plan view of a power generating element 1B according to this modification.

In the power generating element 1B according to this modification, as shown in FIG. 5, an electret material layer is provided in the displacement member 20 rather than in the displacement member 10. More in detail, an electret material layer 22 is provided on the connection surface 20c of the displacement member 20 via an electret electrode layer 21. That is, the electret electrode layer 21 is formed on the connection surface 20c. The electret material layer 22 is formed on the electret electrode layer 21. In this way, in this modification, the connection surface 20c configures the first power generation surface.

Note that, as the materials of the electret electrode layer 21 and the electret material layer 22, the same materials as the materials of the electret electrode layer 11 and the electret material layer 12 can be respectively applied.

A counter electrode layer 32 is provided on the opposed surface 30f of the fixed member 30. Note that, from the viewpoint of power generation efficiency, plane areas of the electret material layer 22 and the counter electrode layer 32 are desirably substantially equal as shown in FIG. 5.

The power generating element 1B performs power generation with vibration of the displacement member 20. As shown in FIG. 3(b), the amplitude of the displacement member 20 increases not only at the resonant frequency fr2 but also at the resonant frequency fr1. Therefore, according to this modification, it is possible to expand the power generation frequency band.

<Modification 3 of the First Embodiment>

The modification 3 of the first embodiment is explained with reference to FIG. 6. FIG. 6 is a plan view of a power generating element 1C according to this modification.

In the power generating element 1C according to this modification, as shown in FIG. 6, an electret material layer is provided not only in the displacement member 10 but also in the displacement member 20. The displacement member 20 and the fixed member 30 are disposed in parallel to each other such that the connection surface 20c of the displacement member 20 and the opposed surface 30f of the fixed member 30 are opposed. The counter electrode layer 31 and the counter electrode layer 32 are provided on the opposed surface 30f of the fixed member 30. In this modification, both of the connection surface 10c and the connection surface 20c configure the first power generation surface. The opposed surface 30f configures the second power generation surface.

The electret material layer 12 is provided on the connection surface 10C. The electret material layer 22 is provided on the connection surface 20c. The counter electrode layer 31 corresponding to the electret material layer 12 and the counter electrode layer 32 corresponding to the electret material layer 22 are provided on the opposed surface 30f.

When vibration energy is given to the power generating element 1C, the elastic deformation bodies 41 and 42 are elastically deformed, whereby a first projection overlap area between the electret material layer 12 and the counter electrode layer 31 and a second projection overlap area between the electret material layer 22 and the counter electrode layer 32 fluctuate. Consequently, according to this modification, it is possible to perform power generation based on the fluctuation in the projection overlap areas using the vibrations of both of the displacement member 10 and the displacement member 20. It is possible to further improve the power generation efficiency.

A frequency characteristic of a power generation amount of the power generating element 1C is explained with reference to FIG. 7. As shown in FIG. 7, a peak waveform P1 (a half-value width h1) of the power generation amount is obtained in the position of the resonant frequency fr1 of the resonant system I. A peak waveform P2 (a half-value width h2) of the power generation amount is obtained in the position of the resonant frequency fr2 of the resonant system II. Note that, in FIG. 7, for convenience, the heights and the widths of the two peak waveforms P1 and P2 are drawn the same. However, actually, the heights and the widths of the individual peak waveforms P1 and P2 are determined by various conditions such as the masses of the displacement members 10 and 20 and spring constants of the elastic deformation bodies 41 and 42.

The power generation amount shown on the vertical axis of FIG. 7 is a total power generation amount of the entire power generating element 1C. That is, the peak waveform P1 includes not only a power generation amount by vibration of the displacement member 10 but also a power generation amount by vibration of the displacement member 20. The same applies to the peak waveform P2. The peak waveform P2 indicates a sum of the power generation amounts by the respective vibrations of the displacement member 10 and the displacement member 20.

As shown in FIG. 3(a) and FIG. 7, the frequency band R1 is not a continuous band that covers an entire range of the frequencies fr1 to fr2 and is a band of a so-called "missing teeth state". Therefore, efficient power generation is not performed about all external vibrations having frequencies in the range of fr1 to fr2. However, an effect of expanding the frequency band capable of generating electric power is obtained compared with a power generation characteristic of a power generating element in which a frequency characteristic has only a single peak.

It is possible to shift the positions of the peaks P1 and P2 of the power generation amount by changing the masses of the displacement members 10 and 20 and the spring constants of the elastic deformation bodies 41 and 42. For example, when frequency components of external vibration given to the power generating element in an actual use environment are distributed in a range wider than the frequency band R1 shown in FIG. 7, as shown in FIG. 8(a), it is desirable to perform adjustment for shifting the resonant frequency fr1 of the peak waveform P1 to be lower and shifting the resonant frequency fr2 of the peak waveform P2 to be higher. In FIG. 8(a), the resonant frequency fr1 of the peak waveform P1 is adjusted to fr1(−) and the peak waveform P1 is shifted to the left side to be a peak waveform P1'. The resonant frequency fr2 of the peak waveform P2 is adjusted to fr2(+) and the peak waveform P2 is shifted to the right side to be a peak waveform P2'. As a result, a frequency band R2 wider than the frequency band R1 is obtained. This frequency band R2 is not a continuous band that covers an entire range of the frequencies fr1(−) to fr2(+) and is a band in a "missing teeth state". However, when external vibration including frequency components in the range of the frequencies fr1(−) to fr2(+) is given, the frequency band R2 shows a desirable frequency characteristic.

Conversely, when frequency components of assumed external vibration are distributed in a range narrower than the frequency band R1, as shown in FIG. 8(b), it is desirable to perform adjustment for shifting the resonant frequency fr1 of the peak waveform P1 to be higher and shifting the resonant frequency fr2 of the peak waveform P2 to be lower. In FIG. 8(b), the resonant frequency fr1 of the peak waveform P1 is adjusted to fr1(+) and the peak waveform P1 is shifted to the right side. The resonant frequency fr2 of the peak waveform P2 is adjusted to fr2(−) and the peak waveform P2 is shifted to the left side. As a result, the two peak waveforms are merged. A merged peak waveform PP having a half-value width hh wider than the half-value widths h1 and h2 is formed. As a result, a frequency band R3 narrower than the frequency band R1 is obtained. Since the merged peak waveform PP is formed, the frequency band R3 is not a band in the "missing teeth state" and is a continuous band that covers an entire range of the frequencies fr1(+) to fr2(−). Therefore, when external vibration including frequency components near the frequencies fr1(+) to fr2(−) is given, it is possible to perform more efficient power generation.

In practical use, it is desirable to design a power generating element having an appropriate frequency characteristic taking into account frequency components of external vibration that occurs in an actual use environment. To design the power generating element, adjustment for shifting the resonant frequencies fr1 and fr2 respectively to desired frequencies is necessary. When frequency components of assumed external vibration are high as a whole or are low as a whole, adjustment for moving a frequency band itself to the left side or the right side along the frequency axis f is necessary.

As explained above in the first embodiment and the modifications 1 to 3 of the first embodiment, the connection surface 10c and/or the connection surface 20c configures the first power generation surface and the opposed surface 30f of the fixed member 30 configures the second power generation surface. The electret material layer is provided on the first power generation surface via the electret electrode layer. The counter electrode layer is provided on the second power generation surface. Note that the present invention is not limited to this. The counter electrode layer may be provided on the first power generation surface and the electret material layer may be provided on the second power generation surface via the electret electrode layer. Therefore, generally speaking, the electret material layer is provided on one surface of the first power generation surface and the second power generation surface and the counter electrode layer is provided on the other surface.

Note that the number of displacement members is not limited to two and may be three or more. For example, another displacement member (not shown in the figure) may be provided on the displacement surface 20b of the displacement member 20 via an elastic deformation body. Consequently, the number of resonant systems further increases. It is possible to further expand the power generation frequency band.

<Power Generating Device>

A power generating device 100 including the power generating element 1 is explained with reference to FIG. 9.

The power generating device 100 includes, as shown in FIG. 9, the power generating element 1 and a power generation circuit 2. The power generation circuit 2 is configured to generate electric power on the basis of a voltage generated between the counter electrode layer 31 and the electret electrode layer 11. In this embodiment, the power generation circuit 2 includes a diode bridge configured from diodes D1, D2, D3, and D4 and a smoothing capacitor C. The power generation circuit 2 rectifies the voltage generated between the counter electrode layer 31 and the electret electrode layer 11 to generate direct-current power. The generated direct-current power is supplied to a load RL via output terminals T1 and T2.

The electret electrode layer 11 and the counter electrode layer 31 are electrically connected to the power generation circuit 2. In this embodiment, as shown in FIG. 9, the electret electrode layer 11 is electrically connected to a connection point X of a cathode of the diode D2 and an anode of the diode D3. The counter electrode layer 31 is electrically connected to a connection point Y of a cathode of the diode D1 and an anode of the diode D4.

Note that the power generation circuit 2 is not limited to generate the direct-current power and may generate and output alternating-current power. For example, the power generation circuit 2 may further include, at a post stage of the diode bridge, an inverter that converts the direct-current power into alternating-current power.

A power generating element included in the power generating device 100 is not limited to the power generating element 1 according to this embodiment and may be the power generating elements 1A to 1C according to the modifications 1 to 3 or may be power generating elements according to embodiments explained below.

Second Embodiment

A power generating element 1D according to a second embodiment of the present invention is explained with reference to FIG. 10. FIG. 10 is a plan view of the power generating element according to this embodiment. In the first embodiment, power generation is performed by increasing and reducing the projection overlap areas between the electret material layers and the counter electrode layers. On the other hand, in the second embodiment, power generation is performed by increasing and reducing the distances between the electret material layers and the counter electrode layers (hereinafter simply referred to as "interlayer distances" as well). The second embodiment is explained below centering on differences from the first embodiment.

The power generating element 1D includes, as shown in FIG. 10, a displacement member 10 connected to the attachment section 51 via the elastic deformation body 42, the displacement member 20 connected to the displacement member 10 via the elastic deformation body 41, and the fixed member 30 attached to the attachment section 52 opposed to the attachment section 51. As in the case of the first embodiment, a two-degree-of-freedom vibration system is formed in the power generating element 1D. The elastic deformation bodies 41 and 42 are elastically deformed, whereby the displacement members 10 and 20 are displaceable in the X-axis direction.

In the second embodiment, the displacement surface 20b configures the first power generation surface. The electret material layer 22 is provided on the displacement surface 20b via the electret electrode layer 21. The opposed surface 30f configures the second power generation surface.

The electret material layer 22 and the counter electrode layer 31 are disposed across a predetermined reference surface. In this embodiment, the electret material layer 22 and the counter electrode layer 31 are disposed to be parallel to a reference plane S as shown in FIG. 11(a). Note that the reference surface may be a curved surface. For example, when the electret material layer 22 is formed in a convex shape and the counter electrode layer 31 is formed in a concave shape that is fit with the convex shape, the reference surface is a curved surface conforming to the convex shape (or the concave shape).

In the power generating element 1D, the displacement member 20 is displaced in the X-axis direction such that an inter-layer distance fluctuates. Power generation is performed by this displacement motion. In this embodiment, the inter-layer distance is the distance between the electret material layer 22 and the counter electrode layer 31 opposed to each other.

The operation of the power generating element 1D according to this embodiment is explained with reference to FIGS. 11(a), (b), and (c). FIG. 11(a) shows a state in which the displacement member 20 is not displaced with respect to the fixed member 30. FIG. 11(b) shows a state in which vibration energy is given to the power generating element 1D and the displacement member 20 is displaced with respect to the fixed member 30. FIG. 11(c) shows a state in which the displacement member 10 approaches the fixed member 30 exceeding the original position with restoration forces of the elastic deformation bodies 41 and 42.

As shown in FIG. 11(a), in the state in which the displacement member 20 is not displaced with respect to the fixed member 30, the inter-layer distance between the electret material layer 22 and the counter electrode layer 31 is d1. Negative electric charges are induced to the counter electrode layer 31 by positive electric charges accumulated in the electret material layer 22.

When a force in a −X-axis direction (an X-axis negative direction) acts on the displacement member 20, as shown in FIG. 11(b), the displacement member 20 separates from the fixed member 30 and the inter-layer distance changes to d2 larger than d1. Consequently, the capacitance of a capacitor configured from the electret electrode layer 21 and the counter electrode layer 31 decreases. Therefore, electric charges inducted to the counter electrode layer 31 decrease. Conversely, when a force in a +X-axis direction (an X-axis positive direction) acts on the displacement member 20, as shown in FIG. 11(c), the displacement member 20 approaches the fixed member 30 and the inter-layer distance changes to d3 smaller than d1. Consequently, the capacitance of the capacitor configured from the electret electrode layer 21 and the counter electrode layer 31 increases. Therefore, electric charges inducted to the counter electrode layer 31 increase.

As explained above, the displacement member 20 vibrates in the vertical direction (i.e., the X-axis direction) with respect to the reference plane S, whereby the inter-layer distance increases and decreases. Consequently, power generation is performed. That is, when vibration energy is given to the power generating element 1D, the elastic deformation bodies 41 and 42 are elastically deformed, whereby the inter-layer distance between the electret material layer 22 and the counter electrode layer 31 fluctuates. Consequently, the power generating element 1D can perform power generation.

In the power generating element 1D, a two-degree-of-freedom vibration system is formed as in the first embodiment. Therefore, according to the second embodiment, it is possible to expand the power generation frequency band.

Modifications 1 and 2 according to this embodiment are explained. In both the modifications, it is possible to obtain the same effects as the effects in the second embodiment.

<Modification 1 of the Second Embodiment>

The modification 1 of the second embodiment is explained with reference to FIG. 12. FIG. 12 is a plan view of a power generating element 1E according to this modification.

In this modification, not only the displacement surface 20*b* but also the displacement surface 10*b* of the displacement member 10 configures the first power generation surface. As shown in FIG. 12, the electret material layer 22 is provided on the displacement surface 20*b* of the displacement member 20 via the electret electrode layer 21 and the electret material layer 12 is provided on the displacement surface 10*b* of the displacement member 10 via the electret electrode layer 11. The electret electrode layer 11 and the electret material layer 12 are, for example, annularly provided.

The fixed member 30 is provided not only in the attachment section 52 but also in the attachment section 51. The opposed surfaces 30*f* of both the fixed members 30 configure the second power generation surface. The counter electrode layer 31 corresponding to the electret material layer 22 is provided on the opposed surface 30*f* of the fixed member 30 attached to the attachment section 52. The counter electrode layer 32 corresponding to the electret material layer 12 is provided on the opposed surface 30*f* of the fixed member 30 attached to the attachment section 51. The counter electrode layer 32 is provided, for example, annularly according to the shape of the electret material layer 12.

When vibration energy is given to the power generating element 1E, the elastic deformation bodies 41 and 42 are elastically deformed, whereby the first inter-layer distance between the electret material layer 22 and the counter electrode layer 31 and the second inter-layer distance between the electret material layer 12 and the counter electrode layer 32 fluctuate. Consequently, according to this modification, it is possible to perform power generation based on the fluctuation in the inter-layer distances using the vibrations of both of the displacement member 10 and the displacement member 20. It is possible to further improve the power generation efficiency.

Note that, as another modification, although not shown in the figure, an electret material layer may be provided only in the displacement member 10.

<Modification 2 of the Second Embodiment>

The modification 2 of the second embodiment is explained with reference to FIG. 13. FIG. 13 is a plan view of a power generating element 1F according to this modification.

In this modification, as shown in FIG. 13, the displacement member 20 is connected to, via the elastic deformation body 43, the attachment section 52 opposed to the attachment section 51. The electret material layer 22 and the counter electrode layer 31 are annularly provided.

According to this modification, it is possible to stably vibrate the displacement members 10 and 20 in the X-axis direction. Since the number of elastic deformation bodies increases from two to three, it is easy to adjust a resonant frequency to a desired value.

In the first and second embodiments and the modifications of the first and second embodiments explained above, the displacement member 20 is disposed on the outside of the displacement member 10. On the other hand, in third to seventh embodiments explained below, the displacement member 20 is disposed on the inside of the displacement member 10.

Third Embodiment

A power generating element 1G according to a third embodiment of the present invention is explained with reference to FIG. 14. FIG. 14 is a plan view of the power generating element according to this embodiment. The power generating element 1G according to this embodiment performs power generation on the basis of an increase and a decrease in projection overlap areas as in the first embodiment. However, the displacement member 20 is disposed on the inside of the displacement member 10. The third embodiment is explained below centering on differences from the first embodiment.

The power generating element 1G includes, as shown in FIG. 14, the displacement member 10 configured in a frame shape, the displacement member 20 disposed on the inside of this displacement member 10, and the fixed member 30 attached to the attachment section 59.

The frame-like displacement member 10 includes a displacement inner surface 10*e*1 (a first displacement inner surface), a displacement inner surface 10*e*2 (a second displacement inner surface) opposed to this displacement inner surface 10*e*1, a connection inner surface 10*e*3, and a connection inner surface 10*e*4. Both the connection inner surfaces 10*e*3 and 10*e*4 connect the displacement inner surface 10*e*1 and the displacement inner surface 10*e*2.

The frame-like displacement member 10 includes a displacement outer surface 10*f*1 (a first displacement outer surface) on the opposite side of the displacement inner surface 10*e*1, a displacement outer surface 10*f*2 (a second displacement outer surface) on the opposite side of the displacement inner surface 10*e*2, a connection outer surface 10*f*3, and a connection outer surface 10*f*4. Both the connection outer surfaces 10*f*3 and 10*f*4 connect the displacement outer surface 10*f*1 and the displacement outer surface 10*f*2.

The displacement member 20 includes, as shown in FIG. 14, a displacement surface 20*e* (a first displacement surface) opposed to the displacement inner surface 10*e*1, a displacement surface 20*f* (a second displacement surface) opposed to the displacement inner surface 10*e*2, a connection surface 20*g*, and a connection surface 20*h*. Both the connection surfaces 20*g* and 20*h* connect the displacement surface 20*e* and the displacement surface 20*f*.

The displacement member 10 and the displacement member 20 are connected via the elastic deformation body 41. In this embodiment, one end of the elastic deformation body 41 is connected to the displacement support point a1 provided on the displacement inner surface 10*e*1 of the displacement member 10. The other end of the elastic deformation body 41 is connected to the displacement support point a2 provided on the displacement surface 20*e* of the displacement member 20.

The displacement member 10 is connected to the attachment section 51 via the elastic deformation body 42. In this embodiment, one end of the elastic deformation body 42 is connected to the displacement support point a3 provided on the displacement outer surface 10*f*2 of the displacement member 10. The other end of the elastic deformation body 42 is connected to the fixed support point b1 provided in the attachment section 51.

In this embodiment, the connection outer surface 10*f*3 of the displacement member 10 configures the first power generation surface. As shown in FIG. 14, the electret material layer 12 is provided on the connection outer surface 10f3 via the electret electrode layer 11. The counter electrode layer 31 corresponding to the electret material layer 12 is provided on the opposed surface 30f configuring the second power generation surface.

When vibration energy is given to the power generating element 1G, a projection overlap area between the electret material layer 12 and the counter electrode layer 31 fluctuates. Power generation is performed by the fluctuation. In the power generating element 1G, a two-degree-of-freedom vibration system is formed as in the first embodiment. Therefore, according to the third embodiment, it is possible to expand the power generation frequency band.

Modifications 1 and 2 according to this embodiment are explained. In both the modifications, it is possible to obtain the same effects as the effects in the third embodiment.

<Modification 1 of the Third Embodiment>

The modification 1 of the third embodiment is explained with reference to FIG. 15. FIG. 15 is a plan view of a power generating element 1H according to this modification. The power generating element 1H performs not only power generation by fluctuation in a projection overlap area between the displacement member 10 and the fixed member 30 but also power generation by fluctuation in the projection overlap area between the displacement member 10 and the displacement member 20.

In this modification, the connection outer surface 10f3 of the displacement member 10 and the connection surface 20g of the displacement member 20 configure the first power generation surface. The opposed surface 30f of the fixed member 30 and the connection inner surface 10e3 of the displacement member 10 configure the second power generation surface.

As shown in FIG. 15, the electret material layer 22 is provided on the connection surface 20g via the electret electrode layer 21. A counter electrode layer 13 (a second counter electrode layer) corresponding to the electret material layer 22 is provided on the connection inner surface 10e3.

When vibration energy is given to the power generating element 1H, the projection overlap area between the electret material layer 12 and the counter electrode layer 31 and a projection overlap area between the electret material layer 22 and the counter electrode layer 13 fluctuate. Consequently, according to this modification, it is possible to perform power generation based on the fluctuation in the projection overlap areas using the vibrations of both of the displacement member 10 and the displacement member 20. It is possible to further improve the power generation efficiency.

Note that the electret material layer 22 may be provided on the connection surface 20h. In this case, the counter electrode layer 13 corresponding to the electret material layer 22 is provided on the connection inner surface 10e4.

<Modification 2 of the Third Embodiment>

The modification 2 of the third embodiment is explained with reference to FIG. 16. FIG. 16 is a plan view of a power generating element 1I according to this modification. The power generating element 1I performs both of power generation by fluctuation in a projection overlap area and power generation by fluctuation in an inter-layer distance. More in detail, the power generating element 1I performs the power generation by the fluctuation in the projection overlap area between the displacement member 10 and the fixed member 30 and performs the power generation by the fluctuation in the inter-layer distance between the displacement member 10 and the displacement member 20.

In this modification, the displacement surface 20f of the displacement member 20 and the connection outer surface 10f3 of the displacement member 10 configure the first power generation surface. As shown in FIG. 16, the electret material layer 22 is provided on the displacement surface 20f via the electret electrode layer 21 and the counter electrode layer 13 corresponding to the electret material layer 22 is provided on the displacement inner surface 10e2.

When vibration energy is given to the power generating element 1I, the projection overlap area between the electret material layer 12 and the counter electrode layer 31 fluctuates and an inter-layer distance between the electret material layer 22 and the counter electrode layer 13 fluctuates. Consequently, according to this modification, it is possible to perform power generation based on the fluctuation in the projection overlap area using the vibrations of both of the displacement member 10 and the displacement member 20. It is possible to further improve the power generation efficiency.

Note that the electret material layer 22 may be provided on the displacement surface 20e. In this case, the counter electrode layer 13 corresponding to the electret material layer 22 is provided on the displacement inner surface 10e1.

Fourth Embodiment

A power generating element 1J according to a fourth embodiment of the present invention is explained with reference to FIG. 17. FIG. 17 is a plan view of the power generating element according to this embodiment. In the power generating element 13 according to this embodiment, the displacement member 20 is disposed on the inside of the displacement member 10 as in the power generating element 1I according to the third embodiment. However, the fourth embodiment is different from the third embodiment in that power generation is performed according to an increase and a decrease in the inter-layer distance between the displacement member 10 and the fixed member 30. The fourth embodiment is explained below centering on differences from the third embodiment.

The power generating element 1J includes, as shown in FIG. 17, the displacement member 10 configured in a frame shape, the displacement member 20 disposed on the inside of this displacement member 10, and the fixed member 30 attached to the attachment section 52.

In this embodiment, the displacement outer surface 10f1 of the displacement member 10 configures the first power generation surface. The electret material layer 12 is provided on the displacement outer surface 10f1 via the electret electrode layer 11. The counter electrode layer 31 corresponding to the electret material layer 12 is provided on the opposed surface 30f configuring the second power generation surface.

When vibration energy is given to the power generating element 1J, an inter-layer distance between the electret material layer 12 and the counter electrode layer 31 fluctuates. Power generation is performed by the fluctuation. In the power generating element 1J, a two-degree-of-freedom vibration system is formed as in the first embodiment. Therefore, according to the fourth embodiment, it is possible to expand the power generation frequency band.

Note that the electret material layer 12 may be provided on the displacement outer surface 10f2. In this case, the fixed member 30 is provided in the attachment section 51 such that the counter electrode layer 31 is opposed to the electret material layer 12.

Modifications 1 and 2 according to this embodiment are explained. In both the modifications, it is possible to obtain the same effects as the effects in the fourth embodiment.

<Modification 1 of the Fourth Embodiment>

The modification 1 of the fourth embodiment is explained with reference to FIG. 18. FIG. 18 is a plan view of a power generating element 1K according to this modification. The power generating element 1K performs power generation by fluctuation in an inter-layer distance not only between the displacement member 10 and the fixed member 30 but also between the displacement member 10 and the displacement member 20.

In this modification, the displacement outer surface 10f1 of the displacement member 10 and the displacement surface 20f of the displacement member 20 configure the first power generation surface. As shown in FIG. 18, the electret material layer 22 is provided on the displacement surface 20f via the electret electrode layer 21. The counter electrode layer 13 corresponding to the electret material layer 22 is provided on the displacement inner surface 10e2.

When vibration energy is given to the power generating element 1K, an inter-layer distance between the electret material layer 12 and the counter electrode layer 31 fluctuates and an inter-layer distance between the electret material layer 22 and the counter electrode layer 13 fluctuates. Consequently, according to this modification, it is possible to perform power generation based on the fluctuation in the inter-layer distances using the vibrations of both of the displacement member 10 and the displacement member 20. It is possible to further improve the power generation efficiency.

Note that the electret material layer 22 may be provided on the displacement surface 20e. In this case, the counter electrode layer 13 corresponding to the electret material layer 22 is provided on the displacement inner surface 10e1.

<Modification 2 of the Fourth Embodiment>

The modification 2 of the fourth embodiment is explained with reference to FIG. 19. FIG. 19 is a plan view of a power generating element 1L according to this modification. The power generating element 1L performs power generation by fluctuation in an inter-layer distance between the displacement member 10 and the fixed member 30 and performs power generation by fluctuation in a projection overlap area between the displacement member 10 and the displacement member 20.

In this modification, the displacement outer surface 10f1 of the displacement member 10 and the connection surface 20g of the displacement member 20 configure the first power generation surface. As shown in FIG. 19, the electret material layer 22 is provided on the connection surface 20g via the electret electrode layer 21. The counter electrode layer 13 corresponding to the electret material layer 22 is provided on the connection inner surface 10e3 of the displacement member 10.

When vibration energy is given to the power generating element 1L, the inter-layer distance between the electret material layer 12 and the counter electrode layer 31 fluctuates and the projection overlap area between the electret material layer 22 and the counter electrode layer 13 fluctuates. Consequently, according to this modification, it is possible to perform power generation based on the fluctuation in the inter-layer distance and the projection overlap area using the vibrations of both of the displacement member 10 and the displacement member 20. It is possible to further improve the power generation efficiency.

Note that the electret material layer 22 may be provided on the connection surface 20h. In this case, the counter electrode layer 13 corresponding to the electret material layer 22 is provided on the connection inner surface 10e4.

Fifth Embodiment

A power generating element 1M according to a fifth embodiment of the present invention is explained with reference to FIG. 20. FIG. 20 is a plan view of the power generating element according to this embodiment. In the power generating element 1M according to this embodiment, the displacement member 20 is disposed on the inside of the displacement member 10 as in the third embodiment. However, the fifth embodiment is different from the third embodiment in that another displacement member 25 is also disposed on the inside of the displacement member 10. The fifth embodiment is explained below centering on differences from the third embodiment.

The power generating element 1M includes, as shown in FIG. 20, the displacement member 10 configured in a frame shape, the displacement member 20 disposed on the inside of this displacement member 10, the fixed member 30 attached to the attachment section 59, and a displacement member 25 (a third displacement member) disposed on the inside of the displacement member 10.

The displacement member 25 is disposed on the inside of the displacement member 10 and is connected to the displacement member 10 via an elastic deformation body 45 (a third elastic deformation body). The mass of the displacement member 25 and a spring constant of the elastic deformation body 45 are set such that a resonant frequency of a resonant system III related to vibration of the displacement member 25 is different from the resonant frequencies of the resonant systems I and II explained above.

When vibration energy is given to the power generating element 1M, the projection overlap area between the electret material layer 12 and the counter electrode layer 31 fluctuates. Power generation is performed by this fluctuation.

A three-degree-of-freedom vibration system is formed in the power generating element 1M. It is possible to further expand the power generation frequency band compared with the third embodiment.

Note that a displacement member may be further provided on the inside of the displacement member 10. Consequently, the number of resonant systems further increases. It is possible to further expand the power generation frequency band.

Sixth and seventh embodiments having more practical configurations are explained.

Sixth Embodiment

A power generating element 1P according to a sixth embodiment is explained with reference to FIGS. 21(a) and (b) and FIG. 22. FIG. 21(a) is a plan view of the power generating element 1P according to this embodiment and FIG. 21(b) is a sectional view taken along an x axis of FIG. 21(a). FIG. 22 is a sectional view taken along a I-I line of FIG. 21(a).

An operation principle of the power generating element 1P according to this embodiment is substantially the same as the operation principle of the power generating elements explained in the third and fourth embodiments. However, the power generating element 1P includes a more practical configuration.

The power generating element 1P includes a frame-like structure 70 (a first frame-like structure) functioning as the displacement member 10, a frame-like structure 80 (a second frame-like structure) functioning as the fixed member 30, and a tabular structure 60 functioning as the displacement member 20. In this embodiment, the displacement member 10 is configured as the frame-like structure 70 surrounding the displacement member 20. The displacement member 20 is configured by the tabular structure 60. The fixed member 30 is configured as the frame-like structure 80 surrounding the frame-like structure 70.

Note that an XYZ three-dimensional orthogonal coordinate system is defined such that the center of the tabular structure 60 is located at an origin O in a state in which the tabular structure 60 and the frame-like structure 70 are not displaced. The XYZ three-dimensional orthogonal coordinate system is fixed to the frame-like structure 80.

The tabular structure 60 is formed in a rectangular shape and includes an upper surface and a lower surface parallel to an XY plane. In this tabular structure 60, displacement support points a21, a22, a23, and a24 are respectively provided at four corner portions of the tabular structure 60. Note that the shape of the tabular structure 60 is not limited to the rectangular shape and may be other shapes such as a circular shape, an elliptical shape, a polygonal shape, and a spherical shape.

The frame-like structure 70 includes, as shown in FIG. 21(a), a displacement inner surface 70a1 (a first displacement inner surface), a displacement inner surface 70a2 (a second displacement inner surface), a connection inner surface 70a3, a connection inner surface 70a4, a displacement outer surface 70b1 (a first displacement outer surface), a displacement outer surface 70b2 (a second displacement outer surface), a connection outer surface 70b3, and a connection outer surface 70b4.

The displacement inner surface 70a2 is a surface opposed to the displacement inner surface 70a1. Both the connection inner surfaces 70a3 and 70a4 are surfaces that connect the displacement inner surface 70a1 and the displacement inner surface 70a2. The displacement outer surface 70b1 is a surface on the opposite side of the displacement inner surface 70a1. The displacement outer surface 70b2 is a surface on the opposite side of the displacement inner surface 70a2. Both the connection outer surfaces 70b3 and 70b4 are surfaces that connect the displacement outer surface 70b1 and the displacement outer surface 70b2.

Displacement support points a11, a12, a13, and a14 are provided at respective four inner corner portions of the frame-like structure 70. Displacement support points a31, a32, a33, and a34 are provided at respective four outer corner portions of the frame-like structure 70.

The frame-like structure 80 includes, as shown in FIG. 21(a), a fixed inner surface 80a (a first fixed inner surface) opposed to the displacement outer surface 70b1 of the frame-like structure 70, a fixed inner surface 80b (a second fixed inner surface) opposed to the displacement outer surface 70b2, a fixed inner surface 80c, and a fixed inner surface 80d. Both the fixed inner surfaces 80c and 80d are surfaces that connect the fixed inner surface 80a and the fixed inner surface 80b. Note that the attachment section 51 in the first embodiment is considered to be configured by the fixed inner surfaces 80a to 80d in this embodiment.

Fixed support points b11, b12, b13, and b14 are provided at respective four inner corner portions of the frame-like structure 80.

As shown in FIG. 21(a), convex sections are provided on the displacement outer surfaces 70b1 and 70b2 of the frame-like structure 70. More in detail, displacement convex sections 71 (first displacement convex sections) are provided on the displacement outer surface 70b1. Displacement convex sections 72 (second displacement convex sections) are provided on the displacement outer surface 70b2. The displacement convex sections 71 project in a Y-axis positive direction. The displacement convex sections 72 project in a Y-axis negative direction. Note that, in this embodiment, four each of the displacement convex sections 71 and 72 are provided. However, the number of the displacement convex sections 71 and 72 is not limited to this. Any number of displacement convex sections may be provided.

As shown in FIG. 21(a), in the frame-like structure 80, fixed convex sections corresponding to the displacement convex sections of the frame-like structure 70 are provided. More in detail, fixed convex sections 81 (first fixed convex sections) are provided in positions of the fixed inner surface 80a opposed to the displacement convex sections 71. Fixed convex sections 82 (second fixed convex sections) are provided in positions of the fixed inner surface 80b opposed to the displacement convex sections 72. The fixed convex sections 81 project in the Y-axis negative direction. The fixed convex sections 82 project in the Y-axis positive direction.

In this embodiment, top surfaces of the displacement convex sections 71 and 72 configure the first power generation surface. Top surfaces of the fixed convex sections 81 and 82 configure the second power generation surface.

The top surfaces of the displacement convex sections 71 and the top surfaces of the fixed convex sections 81 are opposed to each other. Electret material layers are provided on one of these opposed surfaces and counter electrode layers are provided on the other. In this embodiment, electret material layers 75 are provided on the top surfaces of the displacement convex sections 71 via electret electrode layers (not shown in the figure).

A counter electrode layer 85 is provided on the top surfaces of the fixed convex sections 81. This counter electrode layer 85 is electrically connected to a pad P1 via a wire formed on the frame-like structure 80.

The top surfaces of the displacement convex sections 72 and the top surfaces of the fixed convex sections 82 are opposed to each other. Electret material layers are provided on one of these opposed surfaces and counter electrode layers are provided on the other. In this embodiment, electret material layers 76 are provided on the top surfaces of the displacement convex sections 72 via electret electrode layers (not shown in the figure).

A counter electrode layer 86 is provided on the top surfaces of the fixed convex sections 82. This counter electrode layer 86 is electrically connected to a pad P2 via a wire formed on the frame-like structure 80.

Note that the electret material layers 75 and 76 are positively charged in this embodiment. However, the electret material layers 75 and 76 may be negatively charged.

In the power generating device 100 explained above, the pads P1 and P2 are electrically connected to the power generation circuit 2. Electret electrode layers provided between the electret material layers 75 and the displacement outer surface 70b1 and between the electret material layers 76 and the displacement outer surface 70b2 are electrically connected to the power generation circuit 2 via wires (not shown in the figure) formed on the elastic deformation bodies 91 to 94 (explained below).

As shown in FIG. 21(a), stopper protrusions 89 are provided in the frame-like structure 80. More in detail, the stopper protrusions 89 projecting toward the frame-like structure 70 are provided on the fixed inner surfaces 80c and 80d (inner surfaces) of the frame-like structure 80. In a state in which the frame-like structure 70 is not displaced, a predetermined gap dimension is secured between the stopper protrusions 89 and the frame-like structure 70. This gap dimension is set to a dimension that can prevent the frame-like structure 70 from being displaced in the X-axis direction excessively to cause damage to elastic deformation bodies 95 to 98.

Note that stopper protrusions (not shown in the figure) may be provided on the fixed inner surfaces 80*a* and 80*b* toward the frame-like structure 70. For example, the gap dimension may be set to a dimension that can prevent the frame-like structure 70 from being displaced in a Y-axis direction to cause contact and a short-circuit of the electret material layer and the counter electrode layer opposed to each other. In this case, the gap dimension is set such that the electret material layers 75 and the counter electrode layer 85 do not come into contact when the frame-like structure 70 is displaced in the Y-axis positive direction.

The connection among the tabular structure 60, the frame-like structure 70, and the frame-like structure 80 is explained.

As shown in FIG. 21(*a*), the power generating element 1P further includes elastic deformation bodies 91, 92, 93, and 94 that connect the tabular structure 60 and the frame-like structure 70 and elastic deformation bodies 95, 96, 97, and 98 that connect the frame-like structure 70 and the frame-like structure 80. The elastic deformation bodies 91 to 98 are configured by elongated liner structures. As shown in FIG. 21(*b*), the elastic deformation bodies 91 to 98 are thinner than the thickness of the tabular structure 60 and the frame-like structures 70 and 80.

The displacement support points a11 to a14 on the inner side of the frame-like structure 70 and the displacement support points a21 to a24 of the tabular structure 60 respectively correspond in a one-to-one relation. The displacement support points a11 to a14 and the displacement support points a21 to a24 corresponding to each other are respectively connected by the individual elastic deformation bodies 91 to 94. That is, the displacement support point a11 and the displacement support point a21 are connected by the elastic deformation body 91, the displacement support point a12 and the displacement support point a22 are connected by the elastic deformation body 92, the displacement support point a13 and the displacement support point a23 are connected by the elastic deformation body 93, and the displacement support point a14 and the displacement support point a24 are connected by the elastic deformation body 94.

The displacement support points a31 to a34 on the outer side of the frame-like structure 70 and the fixed support points b11 to b14 of the frame-like structure 80 respectively correspond in a one-to-one relation. The displacement support points a31 to a34 and the fixed support points b11 to b14 corresponding to each other are respectively connected by the individual elastic deformation bodies 95 to 98. That is, the displacement support point a31 and the fixed support point b11 are connected by the elastic deformation body 95, the displacement support point a32 and the fixed support point b12 are connected by the elastic deformation body 96, the displacement support point a33 and the fixed support point b13 are connected by the elastic deformation body 97, and the displacement support point a34 and the fixed support point b14 are connected by the elastic deformation body 98.

As explained above, the tabular structure 60 and the frame-like structure 70 are connected by the elastic deformation bodies 91 to 94. The frame-like structure 70 and the frame-like structure 80 are connected by the elastic deformation bodies 95 to 98. Consequently, the tabular structure 60 and the frame-like structure 70 are capable of being displaced in all directions of the X axis, the Y axis, and the Z axis when vibration energy is given to the power generating element 1P.

Note that the tabular structure 60 and/or the frame-like structure 70 may be configured to be displaceable in at least two directions among the X axis, the Y axis, and the Z axis of the XYZ three-dimensional orthogonal coordinate system fixed with respect to the frame-like structure 80.

The elastic deformation bodies 91 to 98 are not limited to being configured from the linear structures as shown in FIG. 21(*a*) and can take various forms. For example, the elastic deformation bodies 91 to 98 may be configured by curved or bent elongated linear structures. By forming the elastic deformation bodies 91 to 98 in the curved or bent shape in this way, the elastic deformation bodies are easily elastically deformed. Spring constants can be reduced. Consequently, it is possible to adjust resonance frequencies to low-frequency external vibration (environmental vibration, etc.).

A specific method for adjusting a resonant frequency of the frame-like structure 70 is explained with reference to FIG. 23. As shown in FIG. 23, adjusting methods for the resonant frequency fr are roughly classified into a method of changing the shape and the material of an elastic deformation body (i.e., a method of changing a spring constant) and a method of changing the mass of a displacement member.

In the former method of changing a spring constant, a thickness t (a dimension in the Z-axis direction), a width w, a length L, or a material (a Young's modulus E) of the elastic deformation body is changed. If the thickness t of the elastic deformation body is reduced, a resonant frequency rf decreases. If the thickness t is increased, the resonant frequency fr increases. If the width w of the elastic deformation body is reduced, the resonant frequency fr decreases. If the width w is increased, the resonant frequency fr increases. If the length L of the elastic deformation body is increased, the resonant frequency fr decreases. If the length L is reduced, the resonant frequency fr increases. If the material of the elastic deformation body is softened (i.e., if the Young's modulus E is reduced), the resonant frequency fr decreases. If the material is hardened (i.e., if the Young's modulus E is increased), the resonant frequency fr increases.

In the latter method of changing the mass of a displacement member, a size or a material (specific gravity) of the displacement member (i.e., the tabular structure 60 and frame-like structure 70) is changed. In both the cases, if mass m is increased, the resonant frequency fr decreases. If the mass m is reduced, the resonant frequency fr increases.

Note that, in order to obtain a desired resonant frequency, the former method of changing the shape and the material of an elastic deformation body and the latter method of changing the mass of a displacement member may be combined.

The operation of the power generating element 1P according to this embodiment is explained.

When a force in the X-axis direction acts on the frame-like structure 70 not displaced, both of a projection overlap area between the displacement convex sections 71 (the electret material layers 75) and the fixed convex sections 81 (the counter electrode layer 85) and a projection overlap area between the displacement convex sections 72 (the electret material layers 76) and the fixed convex sections 82 (the counter electrode layer 86) decrease. Therefore, electric charges electrostatically induced to the counter electrode layers 85 and 86 decrease. As a result, electric charges are discharged from the pads P1 and P2 to the outside of the power generating element 1P.

When the frame-like structure 70 displaced in the X-axis direction receives a restoration force of the elastic deformation body and is about to return to the origin O, both of the projection overlap area between the displacement convex sections 71 and the fixed convex sections 81 and the projection overlap area between the displacement convex sections 72 and the fixed convex sections 82 increase. Therefore, the electric charges induced to the counter electrode layers 85 and 86 increase. As a result, the electric charges are taken into the inside of the power generating element 1P from the pads P1 and P2.

In this way, when the frame-like structure 70 vibrates in the X-axis direction, it is possible to extract electric power based on the fluctuation in the projection overlap areas from the pads P1 and P2.

The power generation by the fluctuation in the projection overlap areas is also performed when the frame-like structure 70 vibrates in the Z-axis direction. More in detail, when the frame-like structure 70 not displaced is displaced in a Z-axis positive direction or a Z-axis negative direction, as it is seen from FIG. 22, the projection overlap area between the electret material layers 75 and the counter electrode layer 85 and the projection overlap area between the electret material layers 76 and the counter electrode layer 86 decrease. Therefore, electric charges are discharged from the counter electrode layers 85 and 86 (i.e., P1 and P2). Thereafter, when the frame-like structure 70 returns to the origin O with a restoration force of the elastic deformation body, both the overlap areas increase. Therefore, the electric charges are taken into the counter electrode layers 85 and 86 (i.e., P1 and P2). In this way, when the frame-like structure 70 vibrates in the Z-axis direction, the power generation by the fluctuation in the projection overlap areas is also performed.

Further, when the frame-like structure 70 vibrates in the Y-axis direction, it is possible to extract electric power based on fluctuation in inter-layer distances from the pads P1 and P2. More in detail, when a force in the Y-axis positive direction acts on the frame-like structure 70 not displaced, an inter-layer distance between the displacement convex sections 71 and the fixed convex sections 81 decreases and an inter-layer distance between the displacement convex sections 72 and the fixed convex sections 82 increases. Therefore, the electric charges induced to the counter electrode layer 85 increase and the electric charges induced to the counter electrode layer 86 decrease. As a result, the electric charges are taken into the inside of the power generating element 1P from the pad P1 and the electric charges are discharged to the outside of the power generating element 1P from the pad P2. Conversely, when a force in the Y-axis negative direction acts on the frame-like structure 70, the electric charges induced to the counter electrode layer 85 decrease and the electric charges inducted to the counter electrode layer 86 increase. As a result, the electric charges are discharged to the outside of the power generating element 1P from the pad P1 and the electric charges are taken into the inside of the power generating element 1P from the pad P2. In this way, when the frame-like structure 70 vibrates in the Y-axis direction, the power generation by the fluctuation in the inter-layer distances is performed.

As explained above, the power generating element 1P according to the sixth embodiment performs the power generation based on the fluctuation in the projection overlap areas when the frame-like structure 70 vibrates in the X-axis or Z-axis direction. The power generating element 1P performs the power generation based on the fluctuation in the inter-layer distances when the frame-like structure 70 vibrates in the Y-axis direction. In this way, according to this embodiment, it is possible to perform efficient power generation using external vibrations in various directions.

In the sixth embodiment, a two-degree-of-freedom vibration system is formed as in the first embodiment. Therefore, it is possible to expand the power generation frequency band. As a result, it is possible to efficiently convert external vibration into electric energy.

In this embodiment, as shown in FIG. 21(*a*), a plurality of sets (four sets) of each of pairs of the displacement convex sections 71 and the fixed convex sections 81 and pairs of the displacement convex sections 72 and the fixed convex sections 82 are provided. Consequently, it is possible to increase a power generation amount at the time when the frame-like structure 70 vibrates in the X-axis or Y-axis direction to four times compared with the case in which the number of pairs is one set. Note that the number of pairs is not limited to the four sets and may be any plurality of sets.

Note that the electret material layers 75 only have to be provided on at least the top surfaces among the surfaces of the displacement convex sections 71. However, the electret material layers 75 may be formed over the entire surface of the displacement outer surface 70*b*1. The same applies to the electret material layers 76.

The disposition of the electret material layers and the counter electrode layers may be changed. That is, the counter electrode layers may be formed on the displacement outer surfaces 70*b*1 and 70*b*2 of the frame-like structure 70. The electret electrode layers and the electret material layers may be formed on the fixed inner surfaces 80*a* and 80*b* of the frame-like structure 80 in this order.

The counter electrode layer 85 only has to be provided on at least the top surfaces among the surfaces of the fixed convex sections 81. However, as shown in FIG. 21(*a*), the counter electrode layer 85 may be formed not only on the top surfaces of the fixed convex sections 81 but also on the side surfaces of the fixed convex sections 81. The counter electrode layer 85 formed on the side surfaces of the fixed convex sections 81 functions as a wire. As shown in FIG. 21(*a*), in order to electrically connect the counter electrode layers formed on the side surfaces of the fixed convex sections 81 adjacent to each other, the counter electrode layer may be formed on the fixed inner surface 80*a*. The same applies to the counter electrode layer 86.

Displacement convex sections (not shown in the figure) may be provided on the connection outer surfaces 70*b*3 and 70*b*4. In this case, fixed convex sections opposed to the displacement convex section are provided on the fixed inner surfaces 80*c* and 80*d*. Consequently, it is possible to perform the power generation by the fluctuation in the inter-layer distances according to vibration in the X-axis direction of the frame-like structure 70 and perform the power generation by the fluctuation in the projection overlap areas according to vibration in the Y-axis direction of the frame-like structure 70.

Note that the shape of the frame-like structures 70 and 80 is not limited to the shape explained above and may be other frame shapes such as an annular shape.

<Manufacturing Method for the Power Generating Element>

An overview of an example of a manufacturing method for the power generating element 1P is explained.

First, a semiconductor substrate such as a silicon substrate is prepared. The thickness of the semiconductor substrate is, for example 300 μm. Subsequently, the semiconductor substrate is machined into a desired shape using a photolithography technique. As the dimensions of parts, for example, the length of one side of the tabular structure 60 is 3 to 7 mm, the width of the displacement convex sections 71 and 72 is 100 to 200 µm, and the height of the displacement convex sections 71 and 72 is 50 to 100 µM. As the size of the elastic deformation bodies 91 to 94, for example, width is approximately 100 µm, thickness is approximately 30 µm, and length is approximately 1 mm. As the size of the elastic deformation bodies 95 to 98, for example, width is approximately 50 to 100 µm, thickness is approximately 30 µm, and length is approximately 1 to 2 mm.

Note that, as the semiconductor substrate, an SOI substrate (Silicon On Insulator) including a surface Si layer, a BOX (Buried Oxide) layer, and a Si substrate may be used. When the SOI substrate is used, the elastic deformation bodies 91 to 98 are configured from only the surface Si layer or the surface Si layer and the BOX layer. When the SOI substrate is used, the BOX layer can be used as an etching stopper. Therefore, it is possible to easily perform an etching process.

After the semiconductor substrate is machined into the desired shape, electret electrode layers made of a conductor such as aluminum or copper are formed on the displacement outer surfaces 70b1 and 70b2 of the frame-like structure 70. As a method for the formation, for example, a PVD (Physical Vapor Deposition) method such as sputtering is used.

Subsequently, the electret material layers 75 and 76 are formed on the electret electrode layer formed on the side surface of the frame-like structure 70. For example, an oxide film containing alkali ions (e.g., potassium ions) is formed by alkali mixed oxidation and polarization processing for applying a voltage to the oxide film while heating the oxide film with a heater is performed, whereby the electret material layers 75 and 76 are formed. As another method, individually-prepared electret material layers may be stuck on the electret electrode layer by an adhesive or the like.

Subsequently, the counter electrode layers 85 and 86 made of a conductor such as aluminum or copper are respectively formed on the fixed inner surfaces 80a and 80b of the frame-like structure 80. The pads P1 and P2 and wires that respectively electrically connect the pads P1 and P2 and the counter electrode layers 85 and 86 are formed on the frame-like structure 80. As a method for the formation, for example, a PVD method such as sputtering is used. Note that, when the electret electrode layer is formed, the counter electrode layers 85 and 86, the pads P1 and P2, and the like may be formed together.

The power generating element 1P is manufactured through the process explained above. Power generating elements according to embodiments and modifications explained below are manufactured by the same method.

A modification according to this embodiment is explained below. In this modification, it is possible to obtain the same effects as the effects in the sixth embodiment.

<Modification of the Sixth Embodiment>

The modification of the sixth embodiment is explained with reference to FIG. 24. FIG. 24 is a sectional view of a power generating element 1Q according to this modification.

In order to improve power generation efficiency with respect to environmental vibration including a relatively a large number of low-frequency components, it is conceivable to reduce a spring constant of an elastic deformation body and reduce a resonant frequency. However, since mechanical strength of the elastic deformation body decreases, there is a problem in that the elastic deformation body is easily broken during a manufacturing process or use of the power generating element. Therefore, in this modification, a weight 69 is provided in the tabular structure 60.

More in detail, in the power generating element 1Q according to this modification, as shown in FIG. 24, the weight 69 is joined to the upper surface of the tabular structure 60. The material of the weight 69 is not particularly limited and may be, for example, a semiconductor such as silicon, an insulator such as resin, or metal. A joining method for the weight 69 and the tabular structure 60 is not particularly limited and may be bonding by an adhesive or may be direct joining of semiconductor substrates (wafers).

The mass of the displacement member (the tabular structure 60 and the frame-like structure 70) is apparently increased by providing the weight 69 in the tabular structure 60 in this way. Therefore, it is possible to reduce the resonant frequency of the tabular structure 60 and the resonant frequency of the frame-like structure 70 without reducing the strength of the elastic deformation body. As a result, it is possible to improve power generation efficiency of the power generating element under environmental vibration including a large number of low-frequency components.

Note that the weight 69 may be joined to the lower surface of the tabular structure 60 or may be joined to both of the upper surface and the lower surface of the tabular structure 60.

Weights may be provided on the upper surface and/or the lower surface of the frame-like structure 70.

Seventh Embodiment

A power generating element 1R according to a seventh embodiment is explained with reference to FIG. 25 and FIG. 26. FIG. 25 is a plan view of the power generating element 1R according to this embodiment. FIG. 26 is a sectional view taken along a I-I line of FIG. 25.

The power generating element 1R according to this embodiment performs power generation using not only displacement of the frame-like structure 70 but also displacement of the tabular structure 60. The seventh embodiment is explained below centering on differences from the sixth embodiment.

The power generating element 1R includes, as shown in FIG. 25 and FIG. 26, the tabular structure 60, the frame-like structure 70, and the frame-like structure 80 including a bottom section 83.

The tabular structure 60 includes displacement surfaces 60a and 60b configuring a first power generation surface. Displacement convex sections 61 projecting in the Y-axis positive direction are provided on the displacement surface 60a. Displacement convex sections 62 projecting in the Y-axis negative direction are provided on the displacement surface 60b. Note that, in this embodiment, two each of the displacement convex sections 61 and 62 are provided. However, the number of the displacement convex sections 61 and 62 is not limited to this. Any number of displacement convex sections may be provided.

The frame-like structure 80 includes a column section 77 including a side surface opposed to the displacement surface 60a of the tabular structure 60 and configuring a second power generation surface and a column section 78 including a side surface opposed to the displacement surface 60b and configuring the second power generation surface. As shown in FIG. 26, the column sections 77 and 78 are protruded on the bottom section 83 of the frame-like structure 80.

A pad P3 is formed on the upper surface of the column section 77. A pad P4 is formed on the upper surface of the column section 78. The pads P3 and P4 are electrically connected to the power generation circuit 2 of the power generating device 100 explained above.

The top surfaces of the displacement convex sections 61 and 62 and the side surfaces of the column sections 77 and 78 are opposed to each other. Electret material layers are provided on one of these opposed surfaces and counter electrode layers are provided on the other. In this embodiment, electret material layers 65 are provided on the top surfaces of the displacement convex sections 61 via electret electrode layers (not shown in the figure). Electret material layers 66 are provided on the top surfaces of the displacement convex sections 62 via electret electrode layers (not shown in the figure). Note that the electret material layers 65 and 66 are positively charged in this embodiment. However, the electret material layers 65 and 66 may be negatively charged.

A counter electrode layer 87 is provided on the side surface of the column section 77. This counter electrode layer 87 is electrically connected to the pad P3 via a wire formed in the column section 77. A counter electrode layer 88 is provided on the side surface of the column section 78. The counter electrode layer 88 is electrically connected to the pad P4 via a wire formed in the column section 78.

The operation of the power generating element 1R according to this embodiment is explained. Power generating operation between the frame-like structure 70 and the frame-like structure 80 are the same as the power generating operation in the sixth embodiment. Therefore, explanation of the power generating operation is omitted. Power generating operation between the tabular structure 60 and the frame-like structure 70 is explained.

When a force in the X-axis direction acts on the tabular structure 60 not displaced, both of a projection overlap area between the displacement convex sections 61 (the electret material layers 65) and the column section 77 (the counter electrode layer 87) and a projection overlap area between the displacement convex sections 62 (the electret material layers 66) and the column section 78 (the counter electrode layer 88) decrease. Therefore, electric charges induced to the counter electrode layers 87 and 88 decrease. As a result, electric charges are discharged from the pads P3 and P4 to the outside of the power generating element 1R.

When the tabular structure 60 displaced in the X-axis direction receives a restoration force of the elastic deformation body and is about to return to the origin O, both of the projection overlap area between the displacement convex sections 61 and the column section 77 and the projection overlap area between the displacement convex sections 62 and the column section 78 increase. Therefore, the electric charges induced to the counter electrode layers 87 and 88 increase. As a result, the electric charges are taken into the inside of the power generating element 1R from the pads P3 and P4.

In this way, when the tabular structure 60 vibrates in the X-axis direction, it is possible to extract electric power based on the fluctuation in the projection overlap areas from the pads P3 and P4.

The power generation by the fluctuation in the projection overlap areas is also performed when the tabular structure 60 vibrates in the Z-axis direction. More in detail, when the tabular structure 60 not displaced is displaced in the Z-axis positive direction or the Z-axis negative direction, as it is seen from FIG. 26, the overlap area between the electret material layers 65 and the counter electrode layer 87 and the overlap area between the electret material layers 66 and the counter electrode layer 88 decrease. Therefore, electric charges are discharged from the counter electrode layers 87 and 88 (i.e., P3 and P4). Thereafter, when the tabular structure 60 returns to the origin O with a restoration force of the elastic deformation body, both the overlap areas increase. Therefore, the electric charges are taken into the counter electrode layers 87 and 88 (i.e., P3 and P4).

When the tabular structure 60 vibrates in the Y-axis direction, it is also possible to extract electric power based on fluctuation in inter-layer distances from the pads P3 and P4. More in detail, when a force in the Y-axis positive direction acts on the tabular structure 60 not displaced, an inter-layer distance between the displacement convex sections 61 and the column section 77 decreases and an inter-layer distance between the displacement convex sections 62 and the column section 78 increases. Therefore, the electric charges induced to the counter electrode layer 87 increase and the electric charges induced to the counter electrode layer 88 decrease. As a result, the electric charges are taken into the inside of the power generating element 1R from the pad P3 and the electric charges are discharged to the outside of the power generating element 1R from the pad P4. Conversely, when a force in the Y-axis negative direction acts on the tabular structure 60, the electric charges induced to the counter electrode layer 87 decrease and the electric charges inducted to the counter electrode layer 88 increase. As a result, the electric charges are discharged to the outside of the power generating element 1R from the pad P3 and the electric charges are taken into the inside of the power generating element 1R from the pad P4.

As explained above, the power generating element 1R according to the seventh embodiment can also perform the power generation by the vibration of the tabular structure 60 in addition to the power generation by the vibration of the frame-like structure 70. The power generating element 1R performs the power generation based on the fluctuation in the projection overlap areas when the tabular structure 60 vibrates in the X-axis or Z-axis direction. The power generating element 1R performs the power generation based on the fluctuation in the inter-layer distances when the tabular structure 60 vibrates in the Y-axis direction. The power generating element 1R performs the power generation based on the fluctuation in the projection overlap areas when the frame-like structure 70 vibrates in the X-axis or Z-axis direction. The power generating element 1R performs the power generation based on the fluctuation in the inter-layer distances when the frame-like structure 70 vibrates in the Y-axis direction. That is, it is possible to perform power generation by displacement in three axis directions with both of the tabular structure 60 and the frame-like structure 70. Therefore, according to this embodiment, it is possible to perform more efficient power generation.

In the seventh embodiment, a two-degree-of-freedom vibration system is formed as in the sixth embodiment. Therefore, it is possible to expand the power generation frequency band. As a result, it is possible to efficiently convert external vibration into electric energy.

Note that, in order to prevent the tabular structure 60 from being excessively displaced to cause damage to the elastic deformation bodies 91 to 94 or in order to prevent the electret material layers 65 and 66 and the counter electrode layers 87 and 88 opposed to each other from coming into contact to cause a short-circuit, the same protrusions as the stopper protrusions 89 explained in the sixth embodiment may be provided. For example, stopper protrusions (not shown in the figure) projecting toward the tabular structure 60 may be provided on the connection inner surfaces 70*a*3 and 70*a*4 of the frame-like structure 70.

The electret material layers 65 only have to be provided on at least the top surfaces among the surfaces of the displacement convex sections 61. However, the electret material layers 65 may be formed over the entire surface of the displacement surface 60*a*. The same applies to the electret material layers 66.

The disposition of the electret material layers and the counter electrode layers may be changed. That is, the counter electrode layers may be formed on the displacement surfaces 60*a* and 60*b* of the tabular structure 60. The electret electrode layers and the electret material layers may be formed on the side surfaces of the column sections 77 and 78 in this order.

Displacement convex sections (not shown in the figure) may be provided on displacement surfaces 60*c* and 60*d*. In this case, fixed convex sections opposed to the displacement convex section are provided on the connection inner surfaces 70*a*3 and 70*a*4.

Those skilled in the art may be able to conceive of additional effects and various modifications of the present invention the basis of the above description. However, forms of the present invention are not limited to the individual embodiments explained above. Components in different embodiments may be combined as appropriate. Various additions, changes, and partial deletions are possible in a range not departing from the conceptual idea and the spirit of the present invention derived from the contents specified in the claims and equivalents of the contents.

REFERENCE SIGNS LIST

1 power generating element
2 power generation circuit
10, 20, 25 displacement member
10*a*, 10*b*, 20*a*, 20*b* displacement surface
10*c*, 20*c* connection surface
11, 21 electret electrode layer
12, 22 electret material layer
30 fixed member
30*a*, 30*b*, 30*c*, 30*d* fixed inner surface
30*f* opposed surface
31, 32 counter electrode layer
41, 42, 43, 45 elastic deformation body
51, 52, 53, 59 attachment section
60 tabular structure
60*a*, 60*b*, 60*c*, 60*d* displacement surface
61, 62, 71, 72 displacement convex section
65, 66, 75, 76 electret material layer
69 weight
70, 80 frame-like structure
70*a*1, 70*a*2 displacement inner surface
70*a*3, 70*a*4 connection inner surface
70*b*1, 70*b*2 displacement outer surface
70*b*3, 70*b*4 connection outer surface
77, 78 column section
80*a*, 80*b*, 80*c*, 80*d* fixed inner surface
81, 82 fixed convex section
83 bottom section
85, 86, 87, 88 counter electrode layer
89 stopper protrusion
91, 92, 93, 94, 95, 96, 97, 98 elastic deformation body
100 power generating device
a1, a2, a3, a4 displacement support point
a11, a12, a13, a14 displacement support point
a21, a22, a23, a24 displacement support point
a31, a32, a33, a34 displacement support point
b1, b2 fixed support point
b11, b12, b13, b14 fixed support point
d1, d2, d3 inter-layer distance
C smoothing capacitor
D1, D2, D3, D4 diode
O origin
P1, P2, P3, P4 pad
RL load
S reference plane
T1, T2 output terminal

The invention claimed is:

1. A power generating element comprising: a first displacement member; a second displacement member; and a fixed member, the first displacement member and the second displacement member being connected via a first elastic deformation body, the first displacement member being connected to an attachment section via a second elastic deformation body, the first displacement member including a first power generation surface, and the fixed member including a second power generation surface opposed to the first power generation surface, and a first electret material layer being provided on the first power generation surface, and a counter electrode layer being provided on the second power generation surface,
wherein
the second displacement member is disposed on an inside of the first displacement member,
wherein
the first displacement member includes: a first displacement inner surface; a second displacement inner surface opposed to the first displacement inner surface; a connection inner surface that connects the first displacement inner surface and the second displacement inner surface; a first displacement outer surface on an opposite side of the first displacement inner surface; a second displacement outer surface on an opposite side of the second displacement inner surface; and a connection outer surface that connects the first displacement outer surface and the second displacement outer surface, and the second displacement member includes: a first displacement surface opposed to the first displacement inner surface; a second displacement surface opposed to the second displacement inner surface; and a connection surface that connects the first displacement surface and the second displacement surface,
wherein
the first electret material layer is provided on the connection outer surface, a first counter electrode layer corresponding to the first electret material layer is provided on the second power generation surface, and when vibration energy is given to the power generating element, a projection overlap area between the first electret material layer and the first counter electrode layer fluctuates.

2. The power generating element according to claim 1, wherein
a second electret material layer is provided on the connection surface,
a second counter electrode layer corresponding to the second electret material layer is provided on the connection inner surface, and
when vibration energy is given to the power generating element, a projection overlap area between the second electret material layer and the second counter electrode layer fluctuates.

3. A power generating device comprising: the power generating element according to claim 2 in which an electret electrode layer is provided between the first electret material layer and the connection outer surface; and a power generation circuit that generates electric power on the basis of a voltage generated between the counter electrode layer and the electret electrode layer.

4. The power generating element according to claim 1, wherein
a second electret material layer is provided on the second displacement surface,
a second counter electrode layer corresponding to the second electret material layer is provided on the second displacement inner surface, and
when vibration energy is given to the power generating element, an inter-layer distance between the second electret material layer and the second counter electrode layer fluctuates.

5. A power generating device comprising: the power generating element according to claim 1 in which an electret electrode layer is provided between the first electret material layer and the connection outer surface; and a power generation circuit that generates electric power on the basis of a voltage generated between the counter electrode layer and the electret electrode layer.

6. A power generating element comprising: a first displacement member; a second displacement member; and a fixed member, the first displacement member and the second displacement member being connected via a first elastic deformation body, the first displacement member being connected to an attachment section via a second elastic deformation body, the first displacement member including a first power generation surface, and the fixed member including a second power generation surface opposed to the first power generation surface, and a first electret material layer being provided on the first power generation surface, and a counter electrode layer being provided on the second power generation surface,
wherein
the second displacement member is disposed on an inside of the first displacement member,
wherein
the first displacement member includes: a first displacement inner surface; a second displacement inner surface opposed to the first displacement inner surface; a connection inner surface that connects the first displacement inner surface and the second displacement inner surface; a first displacement outer surface on an opposite side of the first displacement inner surface; a second displacement outer surface on an opposite side of the second displacement inner surface; and a connection outer surface that connects the first displacement outer surface and the second displacement outer surface, and the second displacement member includes: a first displacement surface opposed to the first displacement inner surface; a second displacement surface opposed to the second displacement inner surface; and a connection surface that connects the first displacement surface and the second displacement surface,
wherein
the first electret material layer is provided on the first displacement outer surface or the second displacement outer surface, a first counter electrode layer corresponding to the first electret material layer is provided on the second power generation surface, and when vibration energy is given to the power generating element, an inter-layer distance between the first electret material layer and the first counter electrode layer fluctuates.

7. The power generating element according to claim 6, wherein
a second electret material layer is provided on the second displacement surface,
a second counter electrode layer corresponding to the second electret material layer is provided on the second displacement inner surface, and
when vibration energy is given to the power generating element, an inter-layer distance between the second electret material layer and the second counter electrode layer fluctuates.

8. The power generating element according to claim 6, wherein
a second electret material layer is provided on the connection surface,
a second counter electrode layer corresponding to the second electret material layer is provided on the connection inner surface, and
when vibration energy is given to the power generating element, a projection overlap area between the second electret material layer and the second counter electrode layer fluctuates.

9. A power generating element comprising: a first displacement member; a second displacement member; and a fixed member,
the first displacement member and the second displacement member being connected via first elastic deformation bodies,
the first displacement member being connected to the fixed member via second elastic deformation bodies,
the first displacement member being connected to the fixed member via second elastic deformation bodies,
wherein
the second displacement member is disposed on an inside of the first displacement member,
wherein
the first displacement member is configured as a first frame-like structure that surrounds the second displacement member,
the second displacement member is configured by a tabular structure, and
the fixed member is configured as a second frame-like structure that surrounds the first frame-like structure,
wherein
the first frame-like structure includes:
a first displacement inner surface;
a second displacement inner surface opposed to the first displacement inner surface;
a connection inner surface that connects the first displacement inner surface and the second displacement inner surface;
a first displacement outer surface on an opposite side of the first displacement inner surface;
a second displacement outer surface on an opposite side of the second displacement inner surface; and
a connection outer surface that connects the first displacement outer surface and the second displacement outer surface, and
the second frame-like structure includes:
a first fixed inner surface opposed to the first displacement outer surface; and
a second fixed inner surface opposed to the second displacement outer surface,
wherein
a first displacement convex section is provided on the first displacement outer surface,
a second displacement convex section is provided on the second displacement outer surface, a first fixed convex section is provided in a position opposed to the first displacement convex section on the first fixed inner surface, a second fixed convex section is provided in a position opposed to the second displacement convex section on the second fixed inner surface, a surface of the first displacement convex section and a surface of the first fixed convex section are opposed to each other, a first electret material layer is provided on one of these opposed surfaces, and a first counter electrode layer is provided on another, and a surface of the second displacement convex section and a surface of the second fixed convex section are opposed to each other, a second electret material layer is provided on one of these opposed surfaces, and a second counter electrode layer is provided on another, the surface of the first displacement convex section and the surface of the second displacement convex section each form a first power generation surface, and the surface of the second fixed convex section and the surface of the first fixed convex section each form a second power generation surface.

10. The power generating element according to claim 9, wherein first displacement support points are provided at respective four corner portions of the tabular structure, second displacement support points are provided at respective four inner corner portions of the first frame-like structure, and third displacement support points are provided at respective four outer corner portions of the first frame-like structure, fixed support points are provided at respective four inner corner portions of the second frame-like structure, the first displacement support points and the second displacement support points respectively correspond in a one-to-one relation, and the first displacement support points and the second displacement support points corresponding to each other are respectively connected by individual first elastic deformation bodies, and the third displacement support points and the fixed support points respectively correspond in a one-to-one relation, and the third displacement support points and the fixed support points corresponding to each other are respectively connected by individual second elastic deformation bodies.

11. The power generating element according to claim 10, wherein the tabular structure includes a displacement surface configuring another first power generation surface, and the second frame-like structure includes a column section including a surface opposed to the displacement surface of the tabular structure and configuring another second power generation surface.

12. The power generating element according to claim 10, wherein a weight is joined to an upper surface and/or a lower surface of the tabular structure.

13. The power generating element according to claim 10, wherein the tabular structure and/or the first frame-like structure is configured to be displaceable in at least two directions among an X axis, a Y axis, and a Z axis of an XYZ three-dimensional orthogonal coordinate system fixed with respect to the second frame-like structure when vibration energy is given to the power generating element.

14. The power generating element according to claim 10, wherein a stopper protrusion projecting toward the first frame-like structure is provided on an inner side surface of the second frame-like structure, and, in a state in which the first frame-like structure is not displaced, a predetermined gap dimension is secured between the stopper protrusion and the first frame-like structure.

15. A power generating device comprising: the power generating element according to claim 10 in which each of the first electret material layer and the second electret material layer is connected to its respective surface by an electret electrode layer; and a power generation circuit that generates electric power on the basis of a voltage generated between the respective counter electrode layer and the electret electrode layer.

16. The power generating element according to claim 9, wherein the tabular structure includes a displacement surface configuring another first power generation surface, and the second frame-like structure includes a column section including a surface opposed to the displacement surface of the tabular structure and configuring another second power generation surface.

17. The power generating element according to claim 16, wherein a displacement convex section is provided on the displacement surface of the tabular structure, and a surface of the displacement convex section and a surface of the column section are opposed to each other, an electret material layer is provided on one of these opposed surfaces, and a counter electrode layer is provided on another.

18. The power generating element according to claim 9, wherein a weight is joined to an upper surface and/or a lower surface of the tabular structure.

19. The power generating element according to claim 9, wherein the tabular structure and/or the first frame-like structure is configured to be displaceable in at least two directions among an X axis, a Y axis, and a Z axis of an XYZ three-dimensional orthogonal coordinate system fixed with respect to the second frame-like structure when vibration energy is given to the power generating element.

20. The power generating element according to claim 9, wherein a stopper protrusion projecting toward the first frame-like structure is provided on an inner side surface of the second frame-like structure, and, in a state in which the first frame-like structure is not displaced, a predetermined gap dimension is secured between the stopper protrusion and the first frame-like structure.

21. A power generating device comprising: the power generating element according to claim 9 in which each of the first electret material layer and the second electret material layer is connected to its respective surface by an electret electrode layer; and a power generation circuit that generates electric power on the basis of a voltage generated between the respective counter electrode layer and the electret electrode layer.

* * * * *